United States Patent
Wakana

(10) Patent No.: US 7,889,382 B2
(45) Date of Patent: Feb. 15, 2011

(54) IMAGE PROCESSING APPARATUS AND CONTROL METHOD THEREFOR

(75) Inventor: Toru Wakana, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1078 days.

(21) Appl. No.: 11/209,725

(22) Filed: Aug. 24, 2005

(65) Prior Publication Data

US 2006/0044592 A1    Mar. 2, 2006

(30) Foreign Application Priority Data

Aug. 25, 2004    (JP) .............................. 2004-245686
Aug. 22, 2005    (JP) .............................. 2005-239762

(51) Int. Cl.
*G06K 15/00*    (2006.01)
*B42D 15/00*    (2006.01)
*G06F 3/12*    (2006.01)

(52) U.S. Cl. ..................... 358/1.18; 358/1.16; 358/1.13; 358/1.9; 283/113; 283/72; 380/201; 380/203

(58) Field of Classification Search ....... 358/1.14–1.18, 358/3.28, 1.9; 713/176; 283/113, 72; 382/275, 382/100, 281; 380/1, 2, 201–203, 54
See application file for complete search history.

(56) References Cited

U.S. PATENT DOCUMENTS

| | | | | |
|---|---|---|---|---|
| 6,024,287 A | * | 2/2000 | Takai et al. .................. 235/493 |
| 6,466,329 B1 | * | 10/2002 | Mukai ........................ 358/1.15 |
| 6,680,783 B1 | * | 1/2004 | Pierce et al. ............... 358/1.14 |
| 6,892,947 B1 | * | 5/2005 | Jam et al. .............. 235/462.01 |
| 7,065,259 B2 | * | 6/2006 | Kunimasa et al. ........... 382/281 |
| 2001/0028727 A1 | * | 10/2001 | Naito et al. .................. 382/100 |
| 2001/0029513 A1 | * | 10/2001 | Kuwano et al. ............. 707/522 |
| 2001/0030761 A1 | * | 10/2001 | Ideyama ..................... 358/1.9 |
| 2003/0147549 A1 | * | 8/2003 | Choi et al. ................... 382/100 |
| 2003/0179412 A1 | * | 9/2003 | Matsunoshita ............. 358/3.28 |
| 2004/0148507 A1 | | 7/2004 | Iwamura et al. |
| 2005/0011958 A1 | * | 1/2005 | Fukasawa et al. ...... 235/462.46 |

FOREIGN PATENT DOCUMENTS

| | | |
|---|---|---|
| CN | 1517231 A | 8/2004 |
| JP | 10-224605 | 8/1998 |
| JP | 10-308868 | 11/1998 |
| JP | 2000-270195 | 9/2000 |
| JP | 2001-324898 | 11/2001 |
| JP | 2001324898 A | * 11/2001 |
| JP | 2003-266863 | 9/2003 |
| JP | 2004-153568 | 5/2004 |

* cited by examiner

*Primary Examiner*—Twyler L Haskins
*Assistant Examiner*—Chad Dickerson
(74) *Attorney, Agent, or Firm*—Fitzpatrick, Cella, Harper & Scinto

(57) ABSTRACT

Leakage of information from a high-quality copy created by reading out data from a storage device is inhibited. A printing apparatus (110) and a multi-function peripheral (120) which is connected to a network (130) store images each corresponding to an identification information. These apparatuses extract an identification information from a document for which a unique identification information is formed, and search a storage device for an image containing an identification information which coincides with the unique identification information. The apparatuses acquire the found image, form copy-forgery-inhibited-pattern image information on the image, and print.

4 Claims, 23 Drawing Sheets

F I G. 10
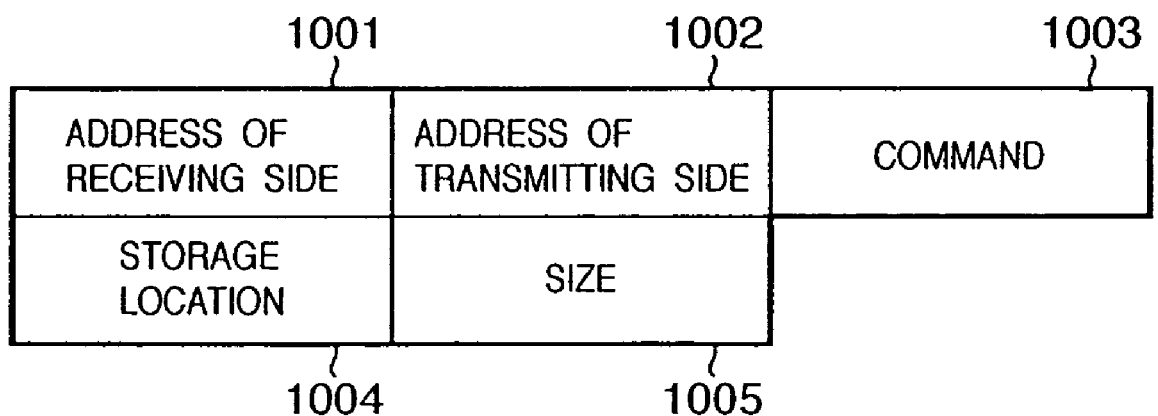

IMAGE PROCESSING APPARATUS AND CONTROL METHOD THEREFOR

FIELD OF THE INVENTION

The present invention relates to an image processing apparatus having a function of reading out an image corresponding to a read document from a storage device and printing the image, and a control method therefor.

BACKGROUND OF THE INVENTION

Conventionally, the following printer is known in patents (e.g., Japanese Patent Laid-Open No. 10-308868). The printer can add the same identification information to an image data and a printed product, and can make a device connected to the printers store temporarily the image data When some printers get an instruction to copy the printed product, those printers search for the stored image data on the basis of the identification information of the printed product, and print the stored image (see, e.g., Japanese Patent Laid-Open No. 10-308868). According to this technique, even if the image quality of the printed product-printed by the printer is degraded, users can get a high-quality printed product.

Recently, the awareness of security is growing, and a method of managing an output-product is becoming increasingly important. So, there is known a technique called "copy-forgery-inhibited-pattern image-print" which utilizes the limit of the reproducibility of the copying machine (scanner). According to this technique, a content image is synthesized with a copy-forgery-inhibited-pattern image to which a character string such as "COPY" is added, and the synthesized image is formed on output-paper. When the output-product is copied, the added character string such as "COPY" appears on the copy (see, e.g., Japanese Patent Laid-Open No. 2001-324898).

A person who obtains a copy of the output-product having a copy-forgery-inhibited-pattern image and content image may refrain from leaking the information when seeing the character string, or may recognize that the information is confidential and refrain from bringing the information out the company. The copy-forgery-inhibited-pattern image is said to be a technique of inhibiting leakage of information by appealing to the human psychology, and a technique of ensuring security to a certain degree.

A copy-forgery-inhibited-pattern image will be explained in detail. A character string such as "COPY" is added in a copy-forgery-inhibited-pattern image so that a person cannot recognize the character string at a glance. However, the added character string appears on a copy obtained by copying the copy-forgery-inhibited-pattern image. Thus, a document (to be referred to as an original document hereinafter which is formed on output-paper by synthesizing the copy-forgery-inhibited-pattern image and document image can be easily discriminated from a copy of the original document. Since the character string such as "COPY" appears on the copy, a person who has copied the document may hesitate to use the copy.

The copy-forgery-inhibited-pattern image is made up of two areas. One area "remains" on a copy upon copying, whereas the other area "disappears" (or "becomes lighter in color than the remaining area"). The reflection densities in these two areas are almost equal to each other on the original document, and thus an added character string such as "C" cannot be recognized by the human eye. In this case, "remain" means that an image on an original document is faithfully reproduced on a copy. "Disappear" means that an image on an original document is not reproduced on a copy. Note that the reflection density is measured by a reflection densitometer.

In the following description, an area which "remains" on a copy will be referred to as a "latent image portion", and an area which "disappears" (or "becomes lighter in color than the remaining area") will be referred to as a "background portion".

FIG. 21 is showing the state of dots on a copy-forgery-inhibited-pattern image. In FIG. 21, an area where dots are clustered and laid out is a latent image portion, and an area where dots are dispersed and laid out is a background portion. Dots in these two areas are generated by different halftone screening processes or different dithering processes. For example, dots at the latent image portion are generated by a halftone screening process at a low LPI, while dots at the background portion are generated by a halftone screening process at a high LPI. Alternatively, dots at the latent image portion are generated using a clustered-dot dither matrix, whereas dots at the background portion are generated using a dispersed-dot dither matrix.

The reproducibility of a copying machine is limited. This reproducibility depends on the input and output resolutions of the copying machine. When dots at the latent image portion are formed larger than the dot that a copying machine can reproduce and dots at the background portion are formed smaller than the dot that a copying machine can reproduce, dots at the latent image portion are generally reproduced on a copy, but dots at the background portion are hardly reproduced. As a result, the latent image portion is reproduced darker than the background portion on the copy. A phenomenon in which an added character string looks popping up because the latent image portion is reproduced darker than the background portion on a copy will be referred to as "visualization".

Images 2101 and 2102 in FIG. 21 show visualization. FIG. 21 conceptually illustrates visualization in which clustered dots (large dots) are reproduced on a copy and dispersed dots (small dots) are not accurately reproduced on the copy.

Note that the copy-forgery-inhibited-pattern image is not limited to the above layout. For example, the "COPY" area can be a background portion, and the other area except the "Copy" area can be a latent-potion. In this example, a character string such as "COPY" is lighter than the other area in a copy.

As described above, when copying of a printed product with identification information is designated, a corresponding image can be read out from a storage device to output a high-quality copy. However, if the person distributes the high-quality copy of the image to the other person, the other person can copy the high-quality copy. As a result, the possibility of the information leak is high if the copy of the high-quality copy is distributed. That is a security problem.

SUMMARY OF THE INVENTION

The present invention has been made in consideration of the above situation. This invention's object is providing an image processing apparatus capable of inhibiting leakage of information from a high-quality copy created by reading out data from a storage device, and a control method therefor.

To solve this problem, an image processing apparatus according to the present invention has the following arrangement.

That is, an image processing apparatus comprises
identification information acquisition means for acquiring identification information contained in an input image, image acquisition means for acquiring an image which corresponds to the identification information acquired by the identification information acquisition means and contains a copy-forgery-inhibited-pattern image, and output means for outputting the corresponding image which is acquired by the image acquisition means and contains the copy-forgery-inhibited-pattern image.

Also, to solve the above problem, a method of controlling an image processing apparatus has the following steps.

That is, a method of controlling an image processing apparatus, comprises an identification information acquisition step of acquiring identification information contained in an input image, an image acquisition step of acquiring an image which corresponds to the identification information acquired in the identification information acquisition step and contains a copy-forgery-inhibited-pattern image, and an output step of outputting the corresponding image which is acquired in the image acquisition step and contains the copy-forgery-inhibited-pattern image.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 10 is a view showing an example of the description of packet data generated by a printing control unit 221;

DETAILED DESCRIPTION OF THE PREFERRED EMBODIMENTS

First Embodiment

The configuration of a system and the flow of a process as a premise of the present invention will be explained.

Figure 1:
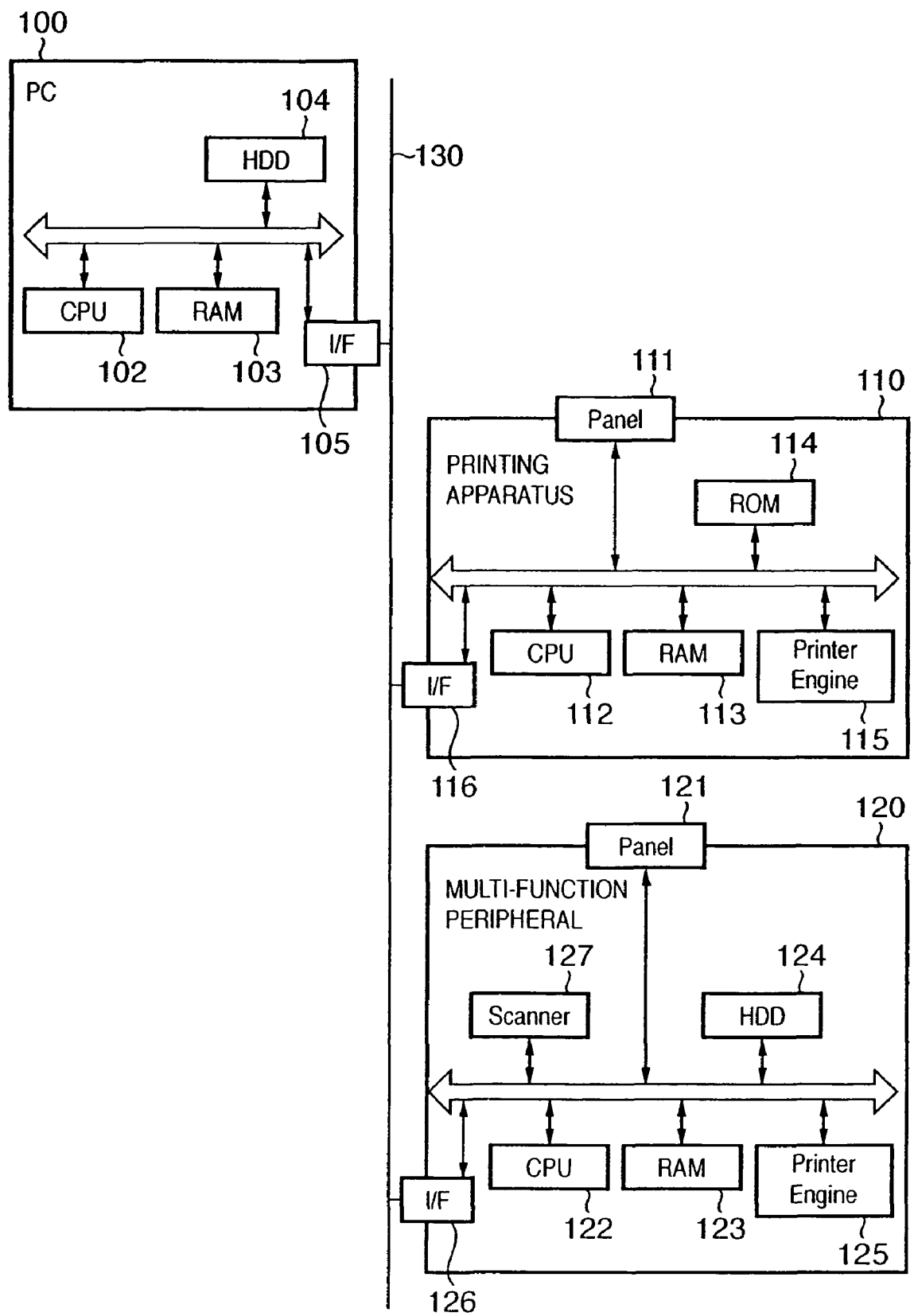
FIG. 1 is a block diagram showing a printing system having a function of reading out an image corresponding to a scanned document from a storage device and printing the image according to the first embodiment of the present invention.

FIG. 1 is a block diagram showing a printing system having a function of reading out an image corresponding to a scanned document from a storage device and printing the image according to the first embodiment of the present invention. As shown in FIG. 1, in the printing system according to the first embodiment, a host computer 100, printing apparatus (printer) 110, and multi-function peripheral 120 are connected to each other via a network 130 such as a LAN. Each apparatus will be described below.

The host computer 100 will be explained. A CPU 102 comprehensively controls processes performed by the host computer 100. A RAM 103 is used as a work area for the CPU 102, and also used as a data save location. A hard disk (HDD) 104 saves software and the like. A communication interface 105 is used to exchange data with another apparatus via the network 130.

The printing apparatus 110 will be explained. A panel 111 is an operation unit for performing various process settings for the printing apparatus 110. A CPU 112 comprehensively controls processes performed by the printing apparatus 110. A RAM 113 is used as a work area for the CPU 112, and also used as a data save location. A ROM 114 saves software and the like. A printer engine 115 forms received image data on output-paper. A communication interface 116 is used to exchange data with another apparatus via the network 130.

The multi-function peripheral 120 will be explained. A panel 121 is an operation unit for performing various process settings by the user for the multi-function peripheral 120. A CPU 122 comprehensively controls processes performed by the multi-function peripheral 120. A RAM 123 is used as a work area for the CPU 122, and also used as a data save location. A hard disk (HDD) 124 saves software and the like. A printer engine 125 forms received image data on output-paper. A communication interface 126 is used to exchange data with another apparatus via the network 130. A scanner 127 optically reads a printed product and generates an electronic image.

Figure 2:
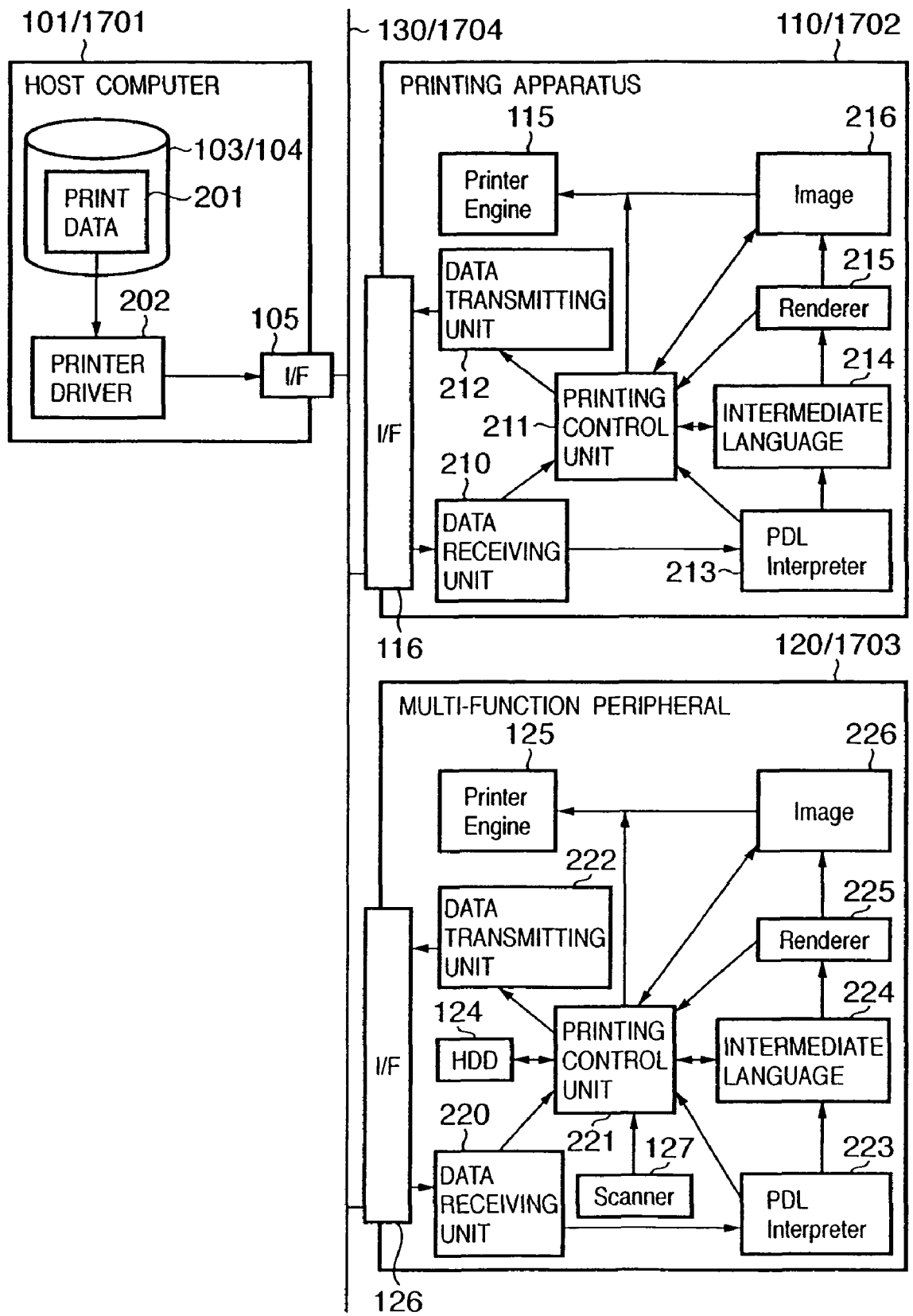
FIG. 2 is a block diagram showing software modules, hardware, and data in the printing system.

FIG. 2 is a block diagram showing software modules, hardware, and data in the printing system. These components will be explained below. The software modules and hardware are comprehensively controlled by the CPUs of the respective apparatuses.

A host computer 101 will be explained. Reference numeral 201 denotes print data which is held in the RAM 103 or HDD 104. Reference numeral 202 denotes a printer driver which is used to print the print data 201.

The printing apparatus 110 will be explained. Reference numeral 210 denotes a data receiving unit. The data receiving unit 210 receives data via the communication interface 116. The data receiving unit 210 analyzes the received data, and determines the destination of the received data on the basis of the analysis result. Reference numeral 211 denotes a printing control unit. Details of a function executed by the printing control unit 211 will be described later.

Reference numeral 212 denotes a data transmitting unit. The data transmitting unit 212 transmits data via the communication interface 116 to an external device connected to the network 130. Reference numeral 213 denotes a PDL interpreter which interprets received print data. The PDL interpreter 213 can interpret a PDL such as PostScript® or LIPS®. The PDL interpreter 213 interprets a PDL, and intermediate language data 214 is obtained by the interpretation. Reference numeral 215 denotes a renderer which bitmaps the intermediate language data 214 to generate image data 216. The image data 216 and intermediate language data 214 will be generally called image data.

The multi-function peripheral 120 will be explained. Reference numeral 220 denotes a data receiving unit. The data receiving unit 220 receives data from an external device via the communication interface 126. The data receiving unit 220 analyzes the received data, and determines the destination of the received data on the basis of the analysis result. Reference numeral 221 denotes a printing control unit. Details of the function of the printing control unit 221 will be described later.

Reference numeral 222 denotes a data transmitting unit. The data transmitting unit 222 transmits data via the communication interface 126 to an external device connected to the network 130. Reference numeral 223 denotes a PDL interpreter which interprets received print data. The PDL interpreter 223 can interpret a PDL such as Postscript® or LIPS®. The PDL interpreter 223 interprets a PDL, and intermediate language data 224 is obtained by the interpretation. The PDL interpreter 223 need not be identical to the above-described PDL interpreter 213, and may also be able to interpret a PDL other than the above-mentioned PDLs. Reference numeral 225 denotes a renderer which bitmaps the intermediate language data 224 to generate image data 226.

Figure 3:
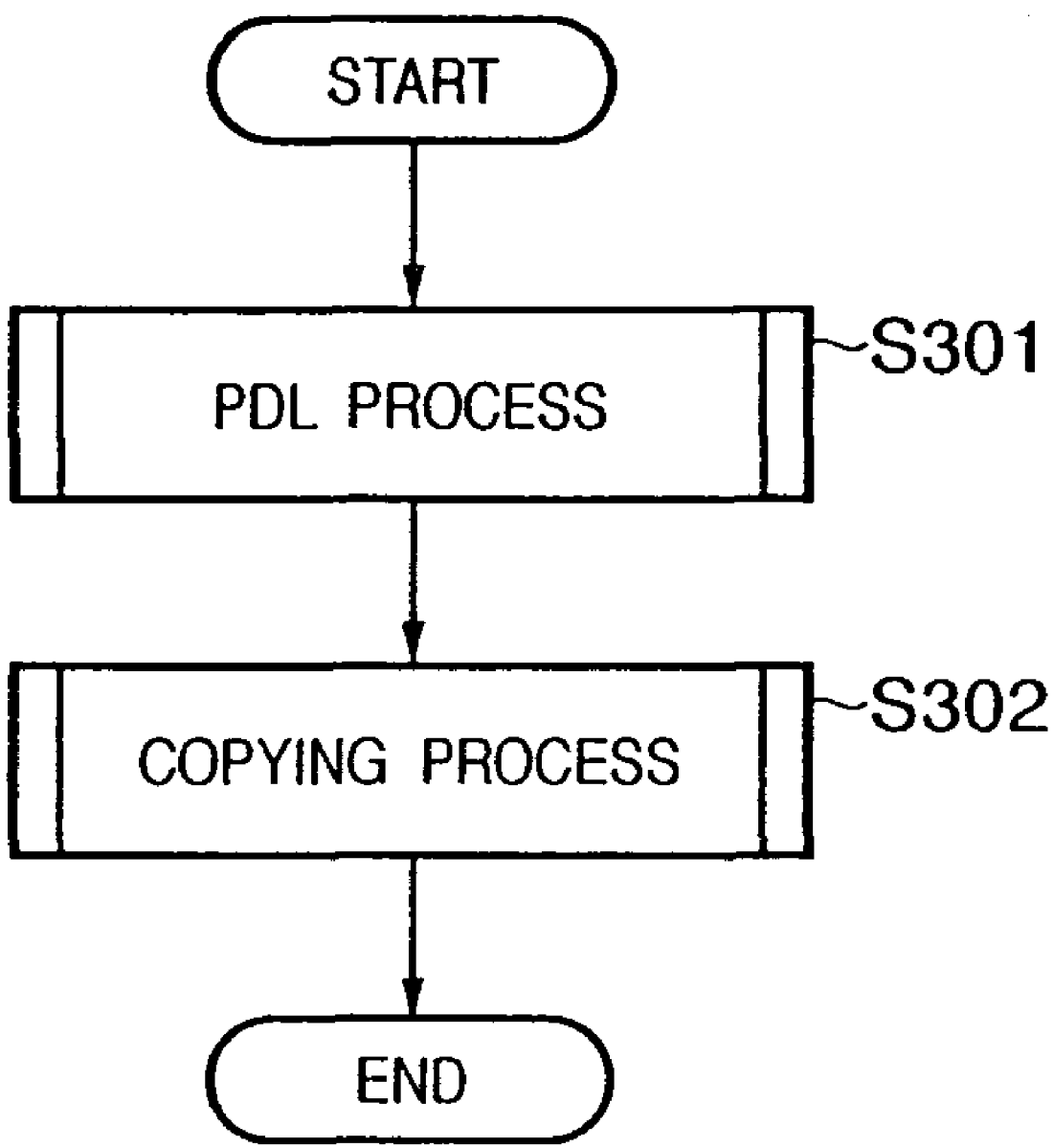
FIG. 3 is a basic flowchart for explaining the sequence of a printing process in the printing system.

FIG. 3 is a basic flowchart for explaining the sequence of a printing process in the printing system. The process sequence will be explained with reference to the basic flowchart. The printing system shown in FIGS. 1 and 2 executes a PDL process first. By this process, a printed product is created (step S301). Then, the printed product is copied (step S302).

Details of the PDL process in step S301 will be described with reference to the flowchart of FIG. 4, and details of the copying process in step S302 will be described with reference to the flowchart of FIG. 8.

Figure 4:
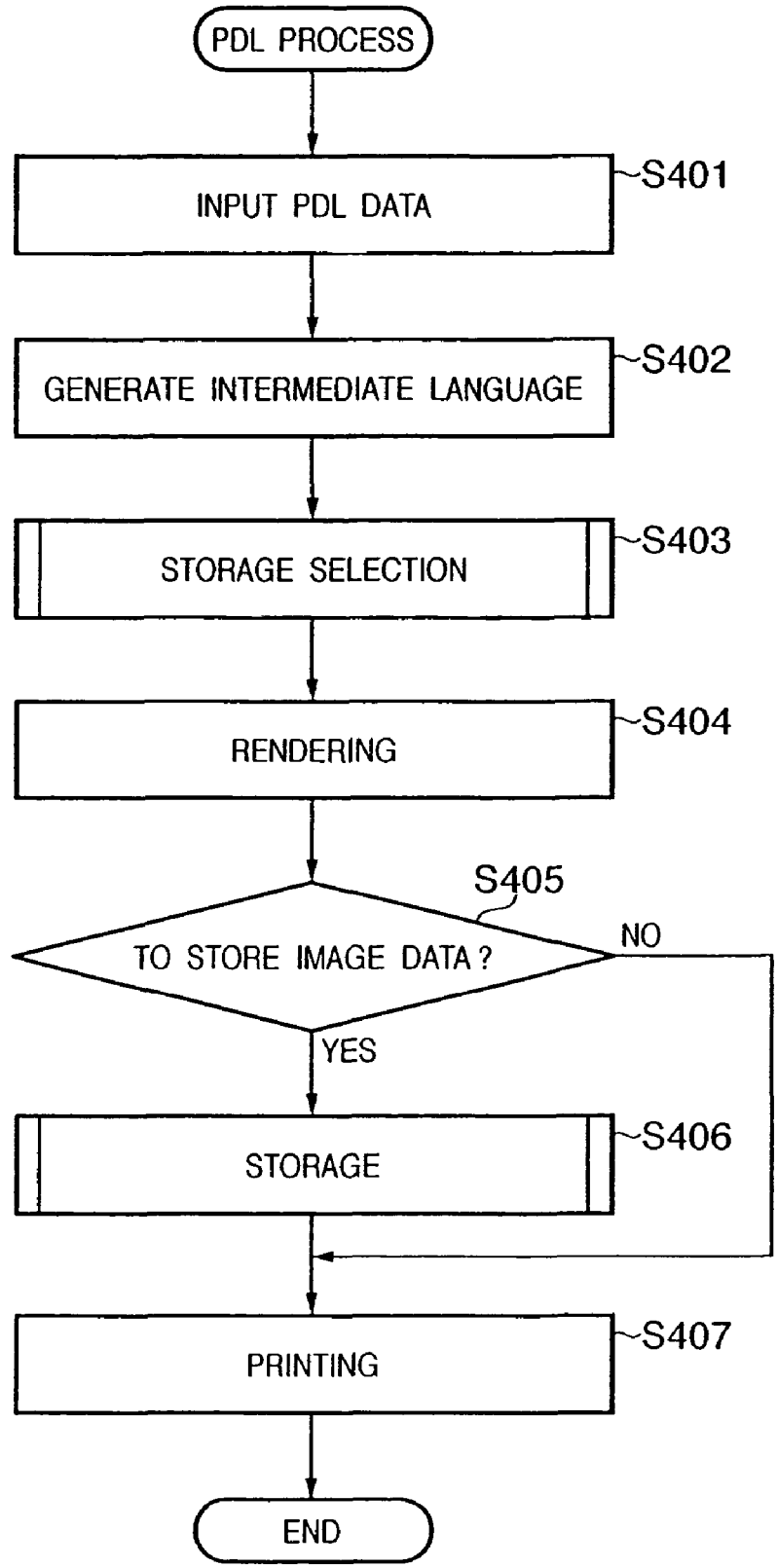
FIG. 4 is a flowchart for explaining details of a PDL process.

FIG. 4 is a flowchart for explaining details of the PDL process. In the PDL process, the printing apparatus 110 receives document image data of the PDL data format that is generated by the host computer 100, forms an image on the basis of the document image data, and stores the image. Details of this process will be explained.

In step S401, the data receiving unit 210 in the printing apparatus 110 receives, via the communication interface 116, PDL data which is generated by the host computer 100. This PDL data must be interpreted by the PDL interpreter 213 installed in the printing apparatus 110. However, the PDL type can be arbitrary as far as PDL data can be interpreted.

In step S402, the PDL interpreter 213 receives the PDL data from the data receiving unit 210, and generates the intermediate language data 214 on the basis of the PDL data. The intermediate language data is a general term including a rendering object (e.g., "bitmap", "run length", "trapezoid", "box", and "bitmap having undergone high-speed boundary encoding"), a background pattern, and a rendering logic used to render the object and background pattern in a raster memory. As is well known, the intermediate language data does not depend on the PDL type. With intermediate language data, even a printer having a different type of PDL interpreter can execute a printing process.

Figure 5:
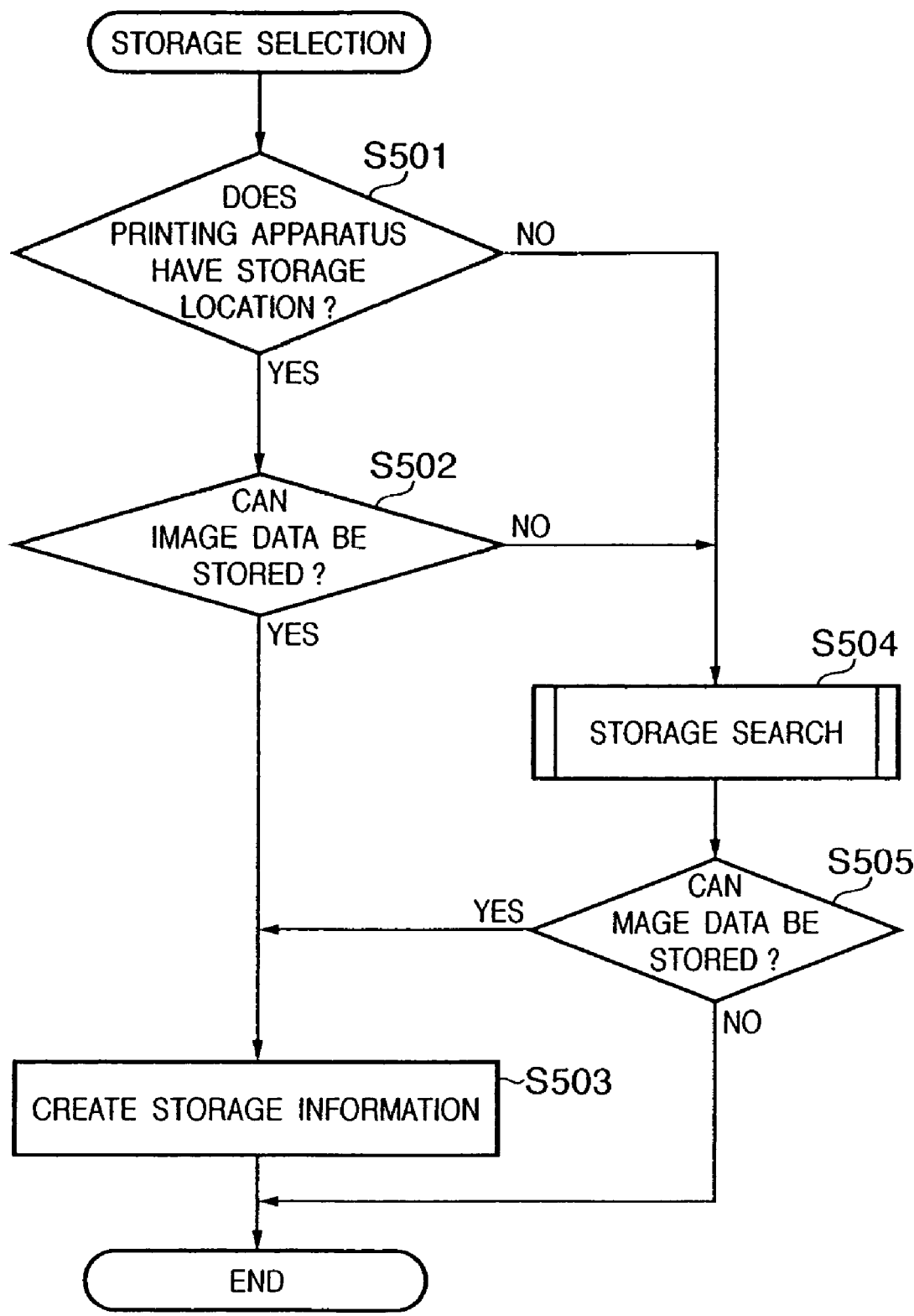
FIG. 5 is a flowchart for explaining details of a storage destination selection process in step S403.

In step S403, the printing control unit 211 selects a storage destination. Selection of the storage destination means selection of a storage device which stores document image data of the image data format. FIG. 5 is a flowchart for explaining details of the storage destination selection process in step S403. Details of this process will be explained.

In step S501, the printing control unit 211 in the printing apparatus 110 determines whether the printing apparatus 110 has a storage location (ROM, HDD, or the like). If it is determined in step S501 that the printing apparatus 110 has a storage location (YES), the flow shifts to step S502. If it is determined in step S501 that the printing apparatus 110 does not have any storage location (NO), the flow shifts to step S504.

In step S502, the printing control unit 211 calculates the data size of image data which may be generated from the document image data in the intermediate language data format. The printing control unit 211 compares the data size with the free space of the storage area to determine whether the document image data can be stored in the image data format in the storage location of the printing apparatus 110. The data size of image data which may be generated from the intermediate data 214 is determined by the number of pages, resolution, and grayscale. For example, for monochrome data having a resolution of 600 dpi and a grayscale of 1 bpp (bits per pixel), the data size is about 4 MB×the number of pages. Determination in this step may be done on the basis of the data size of data encoded by an arbitrary encoding method.

If it is determined in step S502 that the document image data can be stored in the printing apparatus 110 (YES), the flow shifts to step S503. If it is determined in step S502 that the document image data cannot be stored in the printing apparatus 110 (NO), the flow shifts to step S504. In step S504, a process of searching for a storage in an apparatus other than the printing apparatus 110 is executed.

Figure 6:
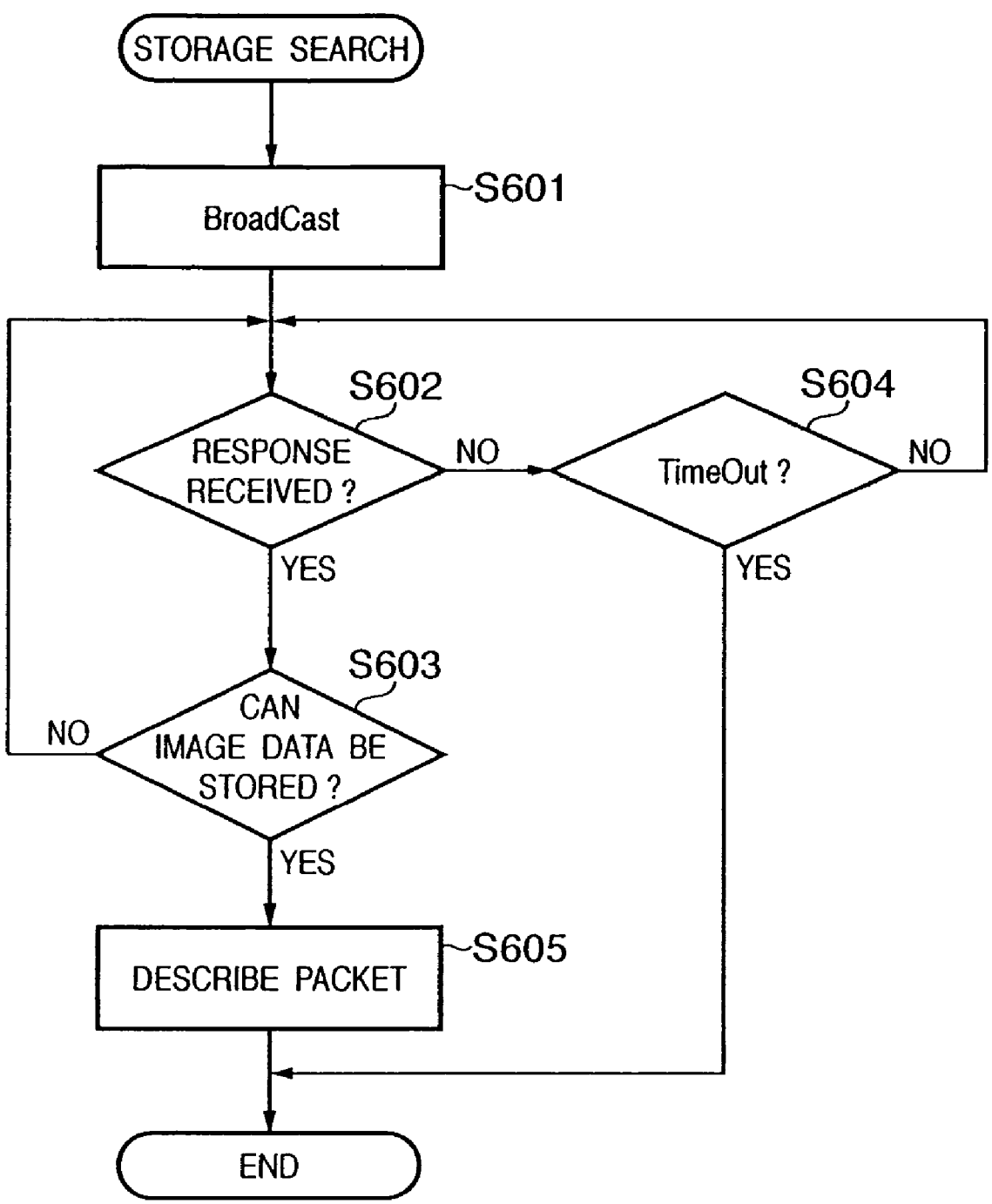
FIG. 6 is a flowchart for explaining details of a storage search process in step S504.
Figure 9:
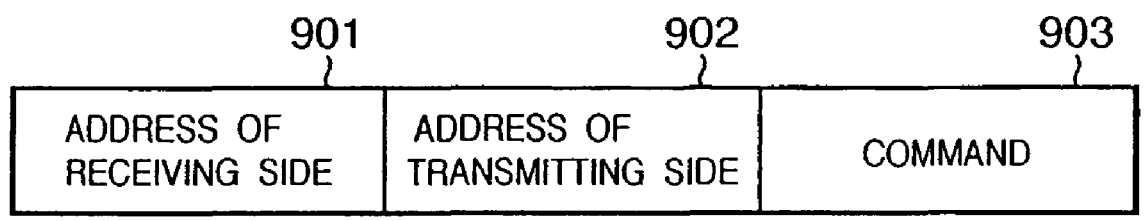
FIG. 9 is a view showing an example of the description of packet data generated by a printing control unit 211.

FIG. 6 is a flowchart for explaining details of the storage search process in step S504. Details of this process will be explained. In step S601, the printing control unit 211 generates packet data shown in FIG. 9. The data transmitting unit 212 transmits the packet data to many unspecified apparatuses on the network 130. Transmission of packet data to many unspecified apparatuses will be called broadcasting. In the packet data, an address representing the address of a receiving side (printing apparatus 110) is described in a field 901, an address representing the address of a transmitting side is described in a field 902, and a command representing "storage search" is described in a field 903. The storage search process is not limited to the above method.

In step S602, the printing control unit 211 determines whether it has received a response to broadcasting performed in step S601. If the printing control unit 211 has received a response (YES), the flow shifts to step S603. If the printing control unit 211 has not received any response (NO), the flow shifts to step S604. The following description assumes that the multi-function peripheral 120 responds to broadcasting.

In step S603, the printing control unit 221 determines whether document image data can be stored in the HDD 124 of the multi-function peripheral 120 which has responded. This process is the same as the determination process in step S502 in the flowchart of FIG. 5. In performing this process, the printing control unit 221 must receive document image data or its data size from the printing apparatus 110 via the printing apparatus 110. The determination process may be executed not in the multi-function peripheral 120 but in the printing apparatus 110.

If the printing control unit 221 in the multi-function peripheral 120 determines in step S603 that the multi-function peripheral 120 can store the document image data (YES), the flow shifts to step S605. In step S605, the printing control unit 221 generates packet data shown in FIG. 10. The multi-function peripheral 120 transmits the packet data to the printing apparatus 110 via the data transmitting unit 222 and communication interface 126. After the packet data is transmitted, the flow shifts to step S505. In the packet data shown in FIG. 10, the address of a receiving side (address of the multi-function peripheral 120) is described in a field 1001, and the address of a transmitting side (address of the printing apparatus 110) is described in a field 1002. A command (command representing a storage search result) is described in a field 1003, a storage location (directory of the storage device) is described in a field 1004, and a size (free space of the storage device) is described in a field 1005. After the above process ends, the flow shifts to step S505. The process of generating packet data may be executed not in the multi-function peripheral 120 but in the printing apparatus 110. In this case, no packet data need be transmitted.

If the printing control unit 221 in the multi-function peripheral 120 determines in step S603 that the multi-function peripheral 120 cannot store the document image data (NO), the flow returns to step S602 again.

In step S604, the printing control unit 211 in the printing apparatus 110 determines whether a time-out has occurred in the storage search process or the like. If a time-out has occurred (YES), the printing control unit 211 determines that no data can be stored, the storage search process ends, and the flow returns to step S505. If no time-out has occurred (NO), the flow returns to step S602.

In step S505, the printing control unit 211 in the printing apparatus 110 determines on the basis of the result of the above-described storage search process whether the document image data can be stored in any storage. If the document image data can be stored (YES), the flow shifts to step S503; if no document image data can be stored (NO), to step S506.

In step S503, the printing control unit 211 in the printing apparatus 110 creates storage information on the basis of the results of steps S502 and S505. In this process, packet data shown in FIG. 10 is generated. In the packet data shown in FIG. 10, the address of a receiving side (address of the multi-function peripheral 120 which can store document image data) is described in the field 1001, and the address of a transmitting side (address of the printing apparatus 110 which has performed the PDL process) is described in the field 1002. The fields 1003, 1004, and 1005 are the same as those described above, and a description thereof will be omitted. Note that when packet data shown in FIG. 10 has already been generated, no packet data need be newly generated. After the above process ends, the flow returns to step S404.

In step S404, the renderer 215 executes a rendering process. In the rendering process, document image data in the intermediate language data format is bitmapped to generate document image data in the image data format.

In step S405, the printing control unit 211 determines whether to store the generated image data. This determination is based on the storage selection result in step S403. If the generated image data can be stored (YES), the flow shifts to step S406. If the generated image data cannot be stored (NO), the flow shifts to step S407. That is, when the generated image data can be stored, the image data is stored in the determined storage, and a printing process in step S407 is executed.

Figure 7:
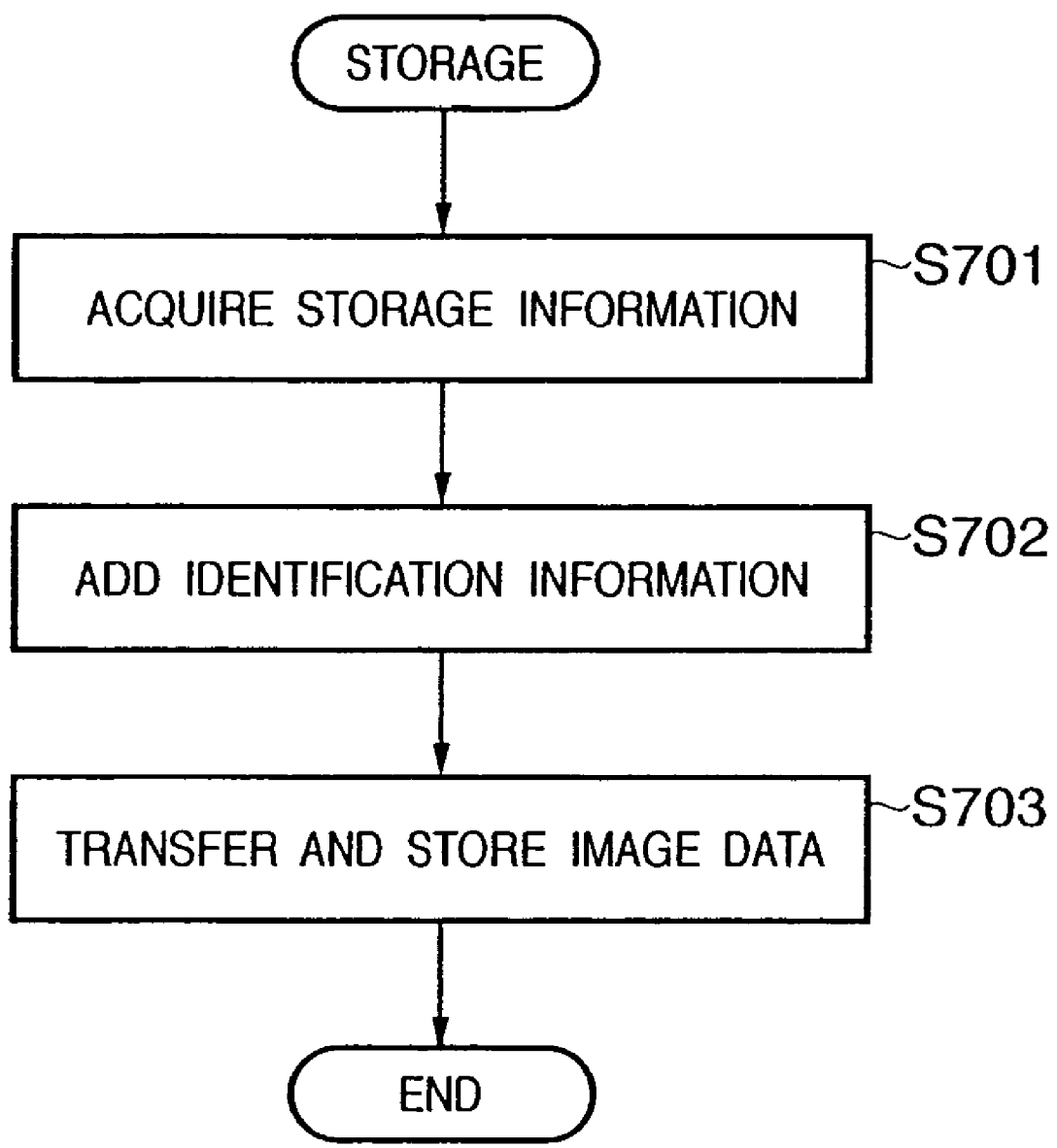
FIG. 7 is a flowchart for explaining details of a storage process in step S406.

FIG. 7 is a flowchart for explaining details of the storage process in step S406. Details of this process will be explained. In step S701, the printing control unit 211 acquires internal information from packet data shown in FIG. 10. This information will be referred to as storage information.

In step S702, the printing control unit 211 generates identification information, and associates it with document image data. Note that the identification information has information for specifying stored document image data and its storage destination. For example, the identification information may contain the IP address of the multi-function peripheral 120, and directory information of document image data stored in the storage device of the multi-function peripheral 120. The identification information may also contain the address of the printing apparatus 110 which has performed the PDL process.

In step S703, the printing control unit 211 designates transfer and storage of the identification information and document image data. The transfer and storage are designated on the basis of the storage information acquired in step S701. More specifically, the document image data and identification information are transmitted from the printing apparatus 110 via the network 130 to the multi-function peripheral 120 which is to store the document image data. The document image data is then stored in the storage device of the multi-function peripheral 120. Details of the storage process in step S406 have been described.

In step S407 after the above storage process, an identification information image which is generated on the basis of the identification information is synthesized in a predetermined area on the document image data, and the synthesized image data is sent to the printer engine 125 and formed on output-paper. In synthesizing the two data, the identification information image which is generated from the identification information is arbitrary as far as the image can be recognized in a subsequent copying process to provide identification information. For example, the identification information image can adopt various formats such as one- and two-dimensional barcodes and a digital watermark. The method of synthesizing these image data is also arbitrary such as a synthesis method capable of acquiring identification information from an identification information image.

In the above description, the printing apparatus 110 executes the storage selection process in step S403 and the identification information generation process in the storage process in step S406. However, the present invention is not limited to them. For example, these processes may be done not by the printing apparatus 110 but by the host computer 100.

The PDL process in step S301 has been described, and the copying process in step S302 will be explained. Note that the copying process assumes that document image data has been stored in the storage device of the multi-function peripheral 120 in the PDL process.

Figure 8:
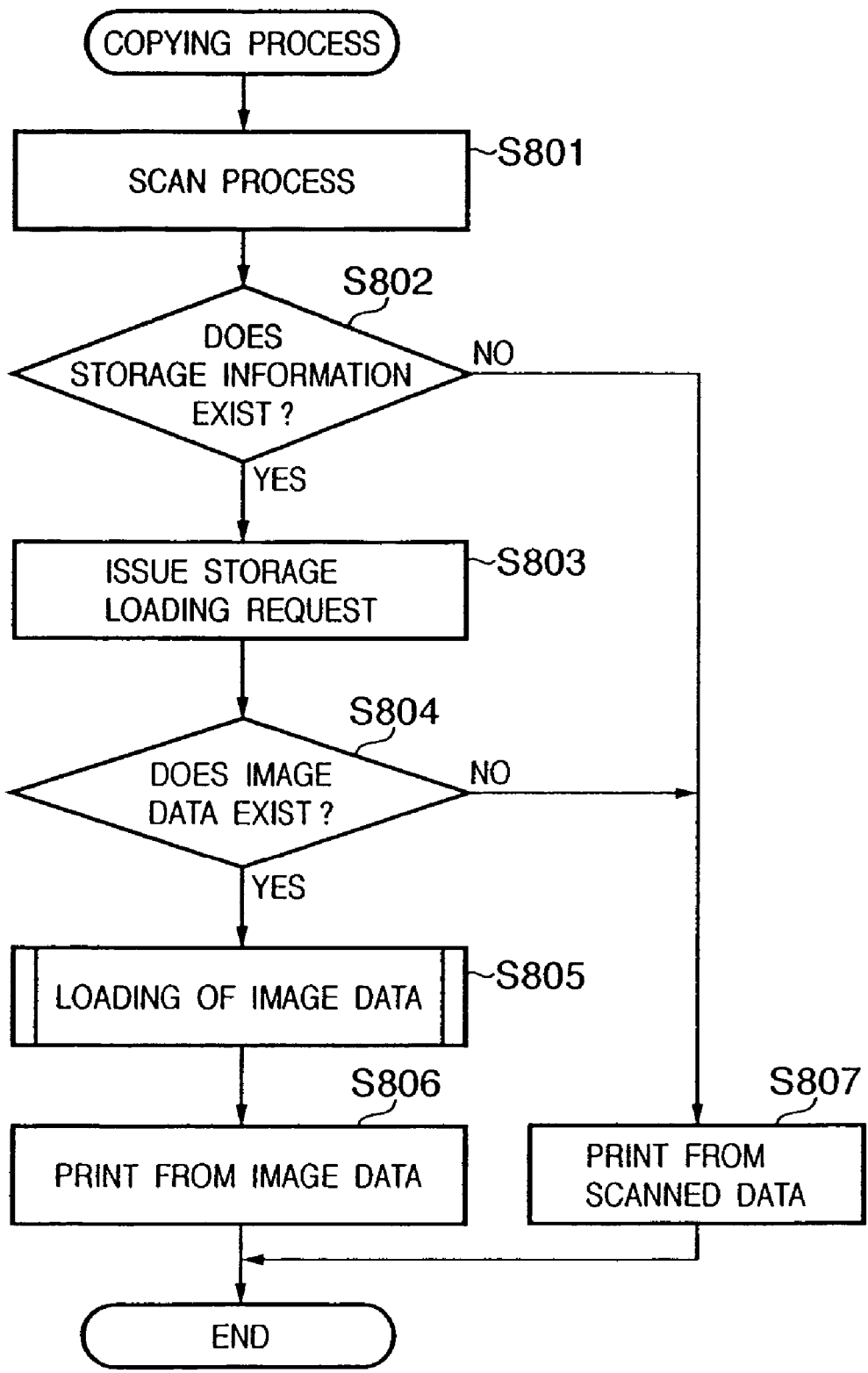
FIG. 8 is a flowchart for explaining details of a copying process in step S302.

FIG. 8 is a flowchart for explaining details of the copying process in step S302. Details of the copying process will be described on the assumption that a paper document output in the PDL process is set on the document table of an arbitrary multi-function peripheral connected to a network and copying is designated. The multi-function peripheral which executes the copying process has almost the same configuration as that of the multi-function peripheral 120 shown in FIG. 2. For example, the printing control unit of the multi-function peripheral which performs the copying process is identical to that of the multi-function peripheral 120 shown in FIG. 2, and reference numeral 221 also denotes the printing control unit of the multi-function peripheral which performs the copying process.

In step S801, the scanner (not shown) of the multi-function peripheral reads a paper document to generate image data of the paper document.

In step S802, the printing control unit 221 determines whether an identification information image exists in the image data of the paper document. If the identification information image exists (YES), the flow shifts to step S803; if no identification information image exists (No), to step S807.

In step S803, the printing control unit 221 issues a storage loading request. In issuing the loading request, the printing control unit 221 acquires, from the identification information image, the address of the multi-function peripheral 120 which has stored image data in the PDL process, and the directory of the storage device in the multi-function peripheral 120 which stores image data. Based on these pieces of information, the printing control unit 221 generates, e.g., packet data shown in FIG. 11. In the following description, acquisition of identification information of an image means acquisition of, e.g., information of an identification information image contained in the image. "Identification information or identification information of an image can be acquired" represents a situation where the image contains identification information and the identification information can be acquired by an apparatus such as the multi-function peripheral 120. "Identification information or identification information of an image is lost" represents a situation where the image does not contain any identification information or the image contains identification information but the identification information cannot be acquired by an apparatus such as the multi-function peripheral 120.

Figure 11:
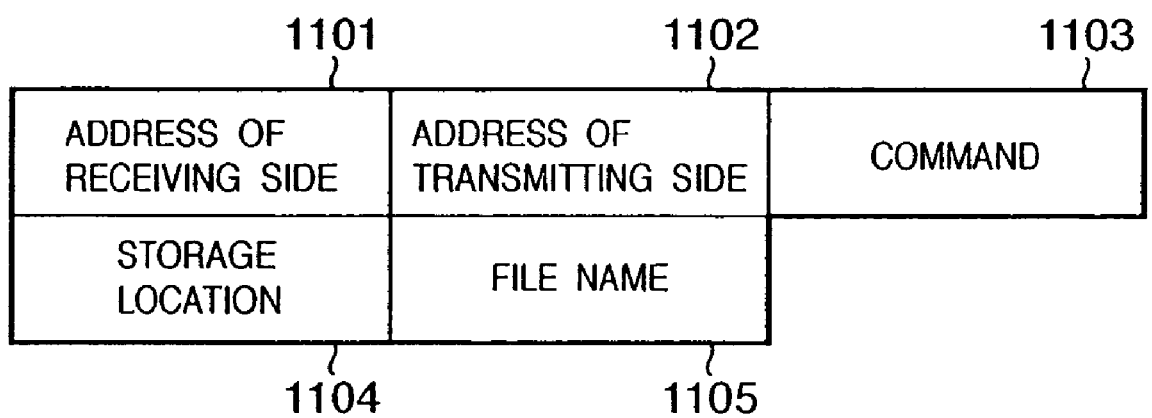
FIG. 11 is a view showing an example of the description of packet data used to read out information from an identification information and issue a loading request.

The packet data shown in FIG. 11 is an example of generated packet data. In the packet data, the address of a receiving side (address of the multi-function peripheral 120 which has stored document image data) is described in a field 1101. The address of a transmitting side (address of the printing apparatus 110 which has performed the PDL process) is described in a field 1102. A command (command representing a storage loading result) is described in a field 1103. A storage location (directory of the storage device) is described in a field 1104. A file name (file name of document image data) is described in a field 1105.

Figure 12:
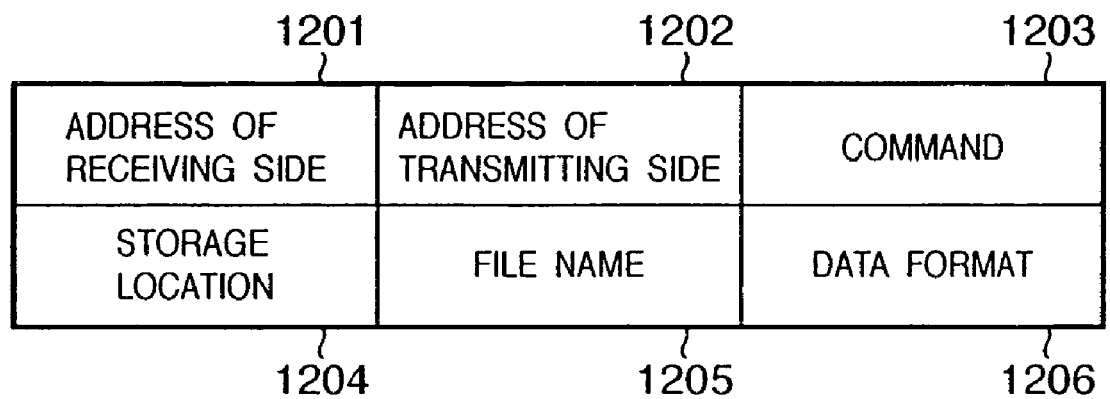
FIG. 12 is a view showing an example of the description of packet data sent back from a device which has received the packet data shown in FIG. 11.

Packet data shown in FIG. 12 is an example of packet data sent back from a device which has received the packet data shown in FIG. 11. The packet data describes a data format 1206 of document image data in addition to information of the packet data shown in FIG. 1.

In step S803, the printing control unit 221 transmits the packet data shown in FIG. 11 via the network 130 to the address of the multi-function peripheral 120 which has stored document image data. If communication with the storing apparatus is established upon this operation, the packet data shown in FIG. 12 is sent back to the multi-function peripheral in response to the storage loading request. When the storing apparatus and the apparatus which performs the copying process coincide with each other, the apparatus need not transmit any packet data via the network 130, and only acquires document image data stored in its storage. If communication with the storing apparatus cannot be established, the packet data shown in FIG. 12 returns with a description "NULL".

In step S804, the printing control unit 221 determines on the basis of the command 1203 in the packet data shown in FIG. 12 whether the document image data exists at a predetermined storage location. If it is determined that the document image data can be loaded (document image data exists) (YES), the flow shifts to step S805. If it is determined that no document image data can be loaded (no document image data exists) (NO), the flow shifts to step S807.

Figure 15:
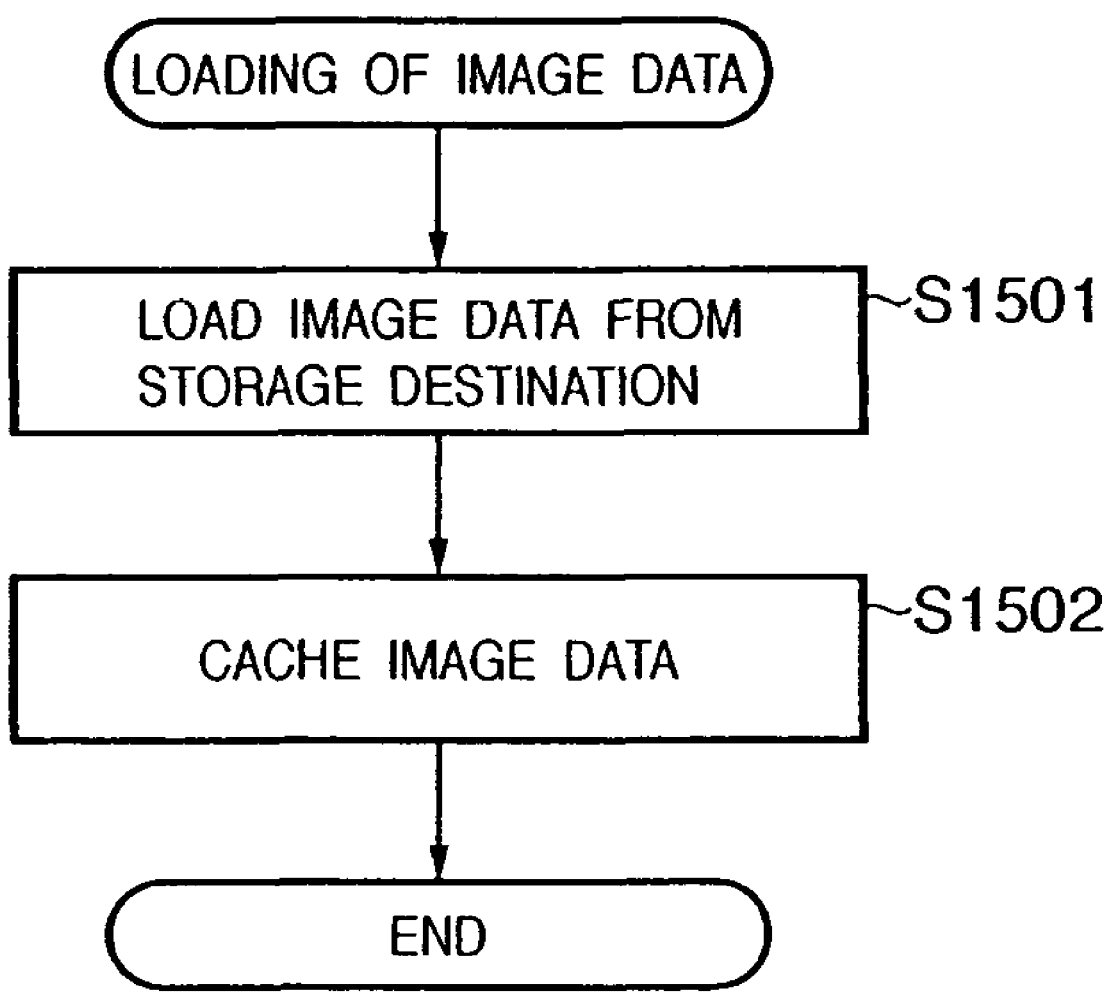
FIG. 15 is a flowchart for explaining details of an image data loading process in step S805.

In step S805, the printing control unit 221 performs, e.g., loading of the document image data from the storage device of the storing multi-function peripheral 120 on the basis of the packet data shown in FIG. 12. FIG. 15 is a flowchart for explaining details of the process. Details of the process will be explained. In step S1501, image data is loaded from the storing apparatus on the basis of the address 1201 in the packet data shown in FIG. 12. In step S1502, the printing control unit 221 stores the document image data in the HDD 124. After the above process ends, the flow shifts to step S806. In step S806, the printer engine 125 forms the loaded image data on output-paper. When the loaded image data does not have the image data format but has the intermediate data format, a rendering process must be executed before image formation.

If it is determined in step S804 that no image data exists (NO), image data scanned in step S801 is developed in the HDD 124 of FIG. 1, and the developed image data is output onto paper by the printer engine 125, similar to a general copying process (step S807).

By reading out from a storage device an image corresponding to identification information in a scanned document and printing out the image, not an output-product generated on the basis of image data obtained by scanning a document, but a high-quality image rendered from the PDL data format can be output. Even if a document is dirty or bears handwriting information, the above process can provide an output-product which is free from any dirt or handwriting information and is identical to the original document.

The configuration of the system and the flow of the process as a premise of the present invention have been described. Details of characteristic processes in the embodiment of the present invention will be explained below.

Figure 17:
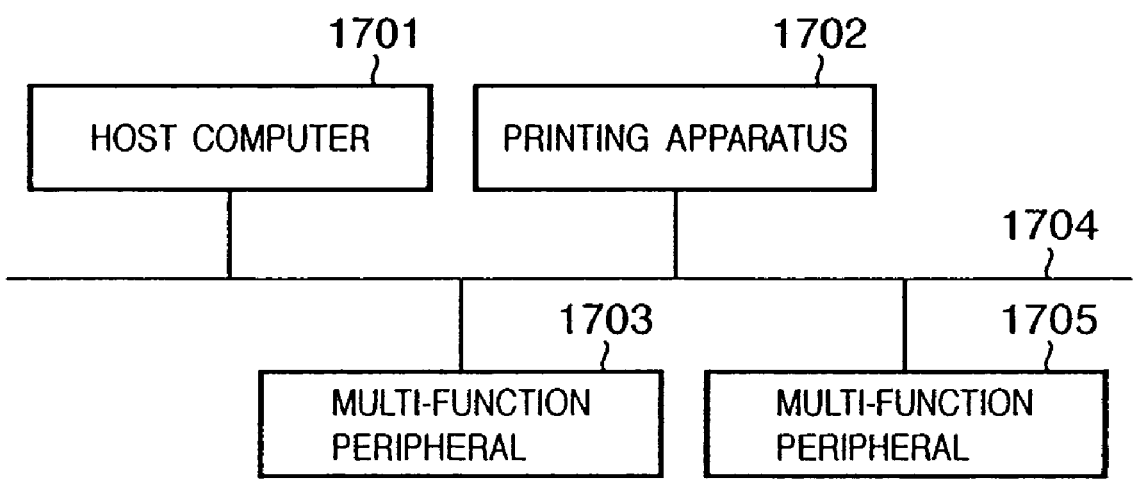
FIG. 17 is a block diagram showing a printing system having a function of reading out an image corresponding to a scanned document from a storage device and printing the image according to the second embodiment of the present invention.

FIG. 17 is a block diagram showing a printing system having a function of reading out an image corresponding to a scanned document from a storage device and printing the image read out. As shown in FIG. 17, in the printing system, a host computer 1701, a printing apparatus 1702, and multi-function peripherals 1703 and 1705 are connected to each other via a network 1704 such as a LAN. The host computer 1701, printing apparatus 1702, and multi-function peripherals 1703 and 1705 in the printing system shown in FIG. 17 are identical to the host computer 100, printing apparatus 110, and multi-function peripheral 120 in the printing system which have been described with reference to FIGS. 1 and 2.

Figure 22:
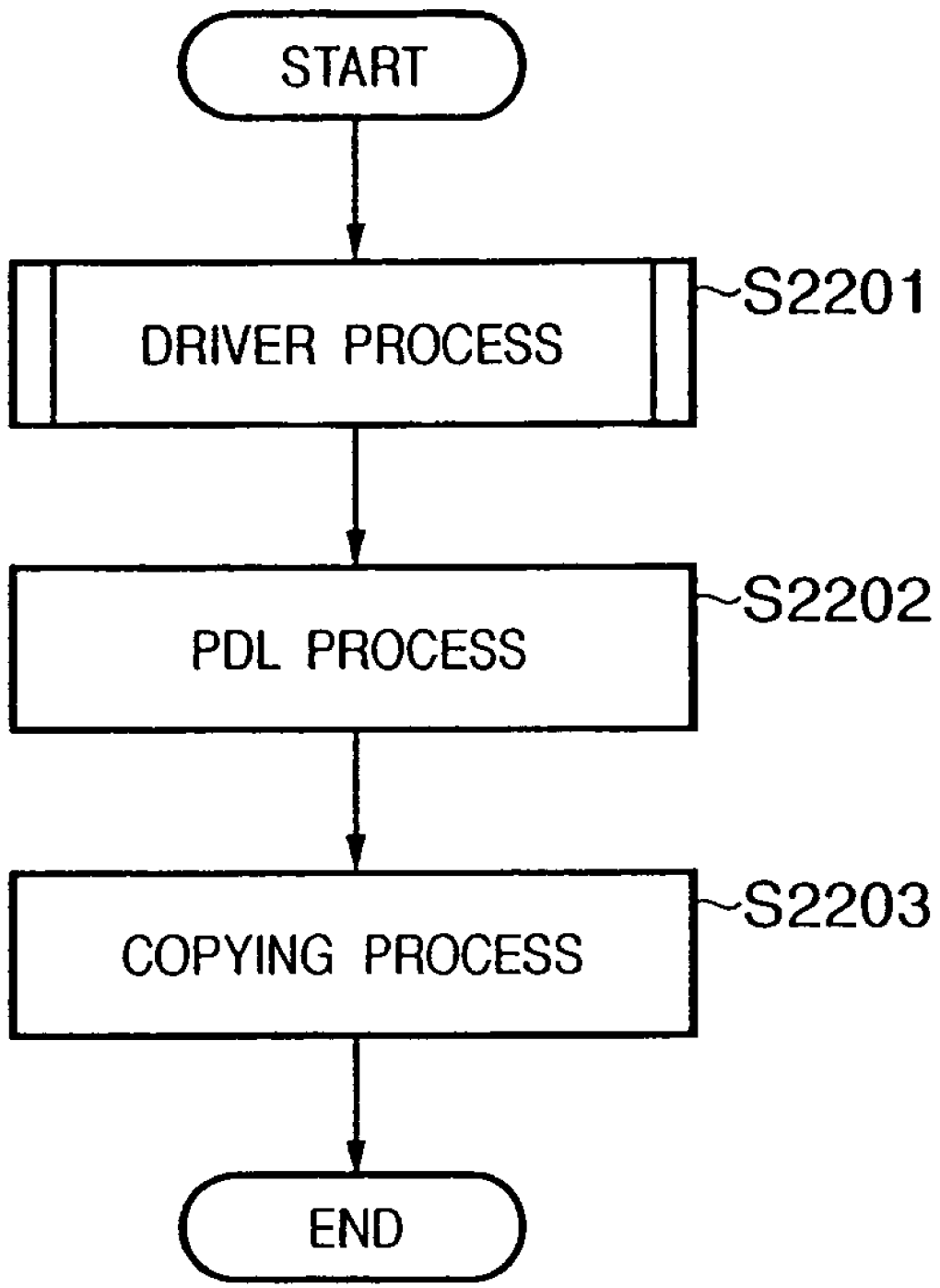
FIG. 22 is a basic flowchart for explaining the sequence of a printing process in a printing system according to the first embodiment of the present invention.

FIG. 22 is a basic flowchart for explaining the sequence of a printing process in the printing system. The process sequence will be explained with reference to the basic flowchart. In the printing system shown in FIG. 17, the host computer 1701 executes a driver process in step S2201 to generate PDL data and transmit it to the printing apparatus 1702. In step S2202, the printing apparatus 1702 executes a PDL process on the basis of the PDL data to create a printed product. In step S2203, the created printed product is copied.

Figure 18:
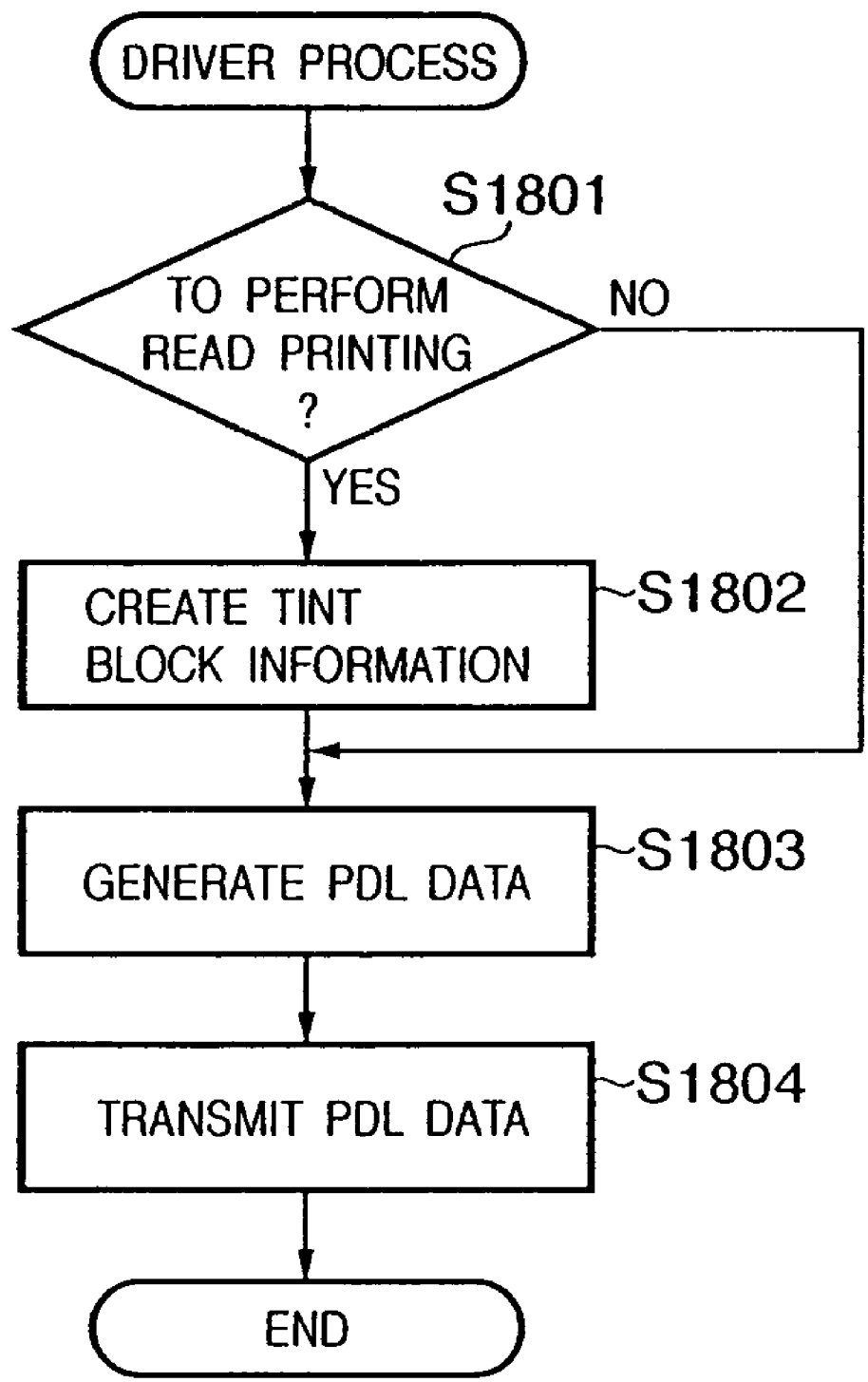
FIG. 18 is a flowchart for explaining details of a driver process in step S2201.

Details of the driver process in step S2201 will be explained with reference to the flowchart of FIG. 18.

In step S1801, the user generates document image data by using the host computer 1701, and sets on a driver window (not shown) whether to perform read-out-printing. If read-out-printing is set in step S1801 (YES), the process shifts to step S1802; if no read-out-printing is set (NO), to step S1803. In read-out-printing, an identification information described above is synthesized with document image data and printed out, and the document image data is stored in an arbitrary storage device. As will be described later, when a readout-printed paper document is copied by a multi-function peripheral in the printing system, the storage device is searched for corresponding image data on the basis of the identification information, and the image data is formed on output-paper.

In step S1802, the printer driver 202 in the host computer 1701 creates copy-forgery-inhibited-pattern image data. After the copy-forgery-inhibited-pattern image data creation process ends, the flow shifts to step S1803. In the following description, copy-forgery-inhibited-pattern image data created in the first embodiment has the image data format. However, the present invention is not limited to this, and the copy-forgery-inhibited-pattern image data may have the intermediate data format.

In step S1803, the printer driver 202 generates PDL data on the basis of the document image data and copy-forgery-inhibited-pattern image data. If no read-out-printing is set in step S1801, PDL data is generated on the basis of only the document image data.

In step S1804, the printer driver 202 transmits the PDL data to the printing apparatus 1702 via the communication interface 105 and network 130. After the above process ends, the flow shifts to step S2202.

In step S2202, the PDL process is executed. If no read-out-printing is set in step S1801, general printout operation is performed, similar to a general printer. That is, intermediate language data is generated from received PDL data, and image data is generated. The image data undergoes an image process, and the image is formed on output-paper. If read-out-printing is set in step S1801, the process is done according to the same flow as that of the PDL process described with reference to FIG. 4. The PDL process in the first embodiment will be simply explained with reference to FIG. 4.

In step S401, the data receiving unit 210 in the printing apparatus 1702 receives generated PDL data via the communication interface 116.

In step S402, the PDL interpreter 213 in the printing apparatus 1702 receives the PDL data from the data receiving unit 210, and forms the intermediate language data 214 from copy-forgery-inhibited-pattern image data and document image data on the basis of the PDL data.

In step S403, the printing control unit 211 in the printing apparatus 1702 selects a storage destination, and generates packet data shown in FIG. 10. Selection of the storage destination means selection of a storage device which is to store document image data and copy-forgery-inhibited-pattern image data. The storage destination selection process is executed on the basis of the flowchart shown in FIG. 5 described above. Details of the process have been described above, and a description thereof will be omitted. In the above-described selection process, a storage destination is selected by comparing the data size of document image data and the storage capacity of the storage device. In the first embodiment, a storage destination is selected by comparing the storage capacity of the storage device and the sum of the data sizes of document image data and copy-forgery-inhibited-pattern image data.

In step S404, the renderer 215 in the printing apparatus 1702 executes a rendering process. In the rendering process, document image data and copy-forgery-inhibited-pattern image data in the intermediate language data format are bit-mapped to generate document image data and copy-forgery-inhibited-pattern image data in the image data format.

In step S405, the printing control unit 211 in the printing apparatus 1702 determines whether to store the generated document image data and copy-forgery-inhibited-pattern image data in the image data format. This determination is based on the storage selection result in step S403. If these image data can be stored (YES), the flow shifts to step S406; if these image data cannot be stored (NO), to step S407.

In step S406, the printing control unit 211 in the printing apparatus 1702 acquires storage information from the packet data (FIG. 10) which has been generated in step S403, and specifies a storage destination. The copy-forgery-inhibited-pattern image data and document image data are stored with their file name in the specified storage destination. In step S406, the copy-forgery-inhibited-pattern image data and document image data may be synthesized and stored, or merely associated with each other and stored without synthesizing them. This also applies to the second embodiment. Note that a stored image will be expressed as an corresponding-image corresponding to identification information or an identification information. In step S406, the printing control unit 211 in the printing apparatus 1702 generates an identification information as image data. As described above, the identification information contains storage information.

In step S407, the printing control unit 211 in the printing apparatus 1702 generates identification information image data from the identification information, synthesizes the generated identification information image data and document image data, and then sends the synthesized image data to the printer engine 125 in the printing apparatus 1702. The printer engine 125 forms the synthesized image data on output-paper to create a paper document.

In step S2203, a copying process is executed. The copying process is performed according to the same flow as that of the copying process described with reference to FIG. 8. The copying process in the first embodiment will be simply explained with reference to FIG. 8. Details of the copying process will be described on the assumption that a paper document created by the PDL process is set on the document table of the multi-function peripheral 1705 and copying is designated.

In step S801, the scanner 127 of the multi-function peripheral 1705 reads a paper document to generate image data of the paper document.

In step S802, the printing control unit 221 in the multi-function peripheral 1705 determines whether an identification information exists in the image data of the paper document. If the identification information exists (YES), the flow shifts to step S803; if no identification information exists (NO), to step S807.

In step S803, the printing control unit 221 in the multi-function peripheral 1705 issues a storage loading request. In issuing the loading request, the printing control unit 221 generates storage information on the basis of the identification information, and generates packet data shown in FIG. 11 on the basis of the storage information. The packet data shown in FIG. 11 describes the storage information, as described above. The storage information and the packet data shown in FIG. 11 have been described above, and a description thereof will be omitted.

In step S803, the printing control unit 211 in the multi-function peripheral 1705 transmits the packet data shown in FIG. 11 to the address of the storing multi-function peripheral 1703. If communication with the storing multi-function peripheral 1703 is established upon this operation, the packet data shown in FIG. 12 is sent back to the multi-function peripheral 1705 in response to the storage loading request. The packet data shown in FIG. 12 describes the storage information, and a command (whether document image data and copy-forgery-inhibited-pattern image data exist in the storage device) representing the return value of the storage loading request.

In step S804, the printing control unit 221 in the multi-function peripheral 1705 determines on the basis of the command 1203 in the packet data shown in FIG. 12 whether the document image data and copy-forgery-inhibited-pattern image data exist at a predetermined storage location. If it is determined that these image data can be loaded (image data exist) (YES), the flow shifts to step S805; if it is determined that no image data can be loaded (no image data exists) (NO), to step S807.

In step S805, the printing control unit 221 in the multi-function peripheral 1705 reads out the document image data and copy-forgery-inhibited-pattern image data from the storing apparatus on the basis of the packet data shown in FIG. 12.

In step S806, the printing control unit 221 in the multi-function peripheral 1705 synthesizes the two readout image data, and sends the synthesized image data to the printer engine 125. The printer engine 125 forms the image data on output-paper. When the copy-forgery-inhibited-pattern image data and document image data are not associated with each other but are synthesized and saved in step S406, these image data need not be synthesized in step S806. No identification information image data is synthesized with document image data which is synthesized with copy-forgery-inhibited-pattern image data. This also applies to the second embodiment.

If it is determined in step S804 that no image data exists (NO), image data scanned in step S801 is developed in the HDD 124 of FIG. 1, and the developed image data is output onto paper by the printer engine 125, similar to a general copying process (step S807).

Note that copy-forgery-inhibited-pattern image data is generated in the host computer 1701 in the above description, but the present invention is not limited to this. For example, copy-forgery-inhibited-pattern image data may be generated in, e.g., the printing apparatus 110 which receives PDL data. This also be applied to other embodiments. When copy-forgery-inhibited-pattern image data is generated in the printing apparatus 110, the process in step S1802 of step S2201 is omitted. Also, no PDL data need be generated on the basis of document image data and copy-forgery-inhibited-pattern image data in step S1803 of step S2201, and PDL data suffices to be generated on the basis of document image data.

In step S1804 of step S2201, the generated PDL data is transmitted to the printing apparatus 110. However, for example, in step S404 of step S2202, the rendering process must be performed to generate document image data in the image data format and also generate copy-forgery-inhibited-pattern image data. The copy-forgery-inhibited-pattern image data may be generated in neither the host computer 1701 nor printing apparatus 1702 but in the multi-function peripheral 1705. In this case, the process in step S1802 of step S2201 is omitted.

In step S1803 of step S2201, no PDL data need be generated on the basis of document image data and copy-forgery-inhibited-pattern image data, and PDL data suffices to be generated on the basis of document image data. In step S1804 of step S2201, the generated PDL data suffices to be transmitted to the printing apparatus 110. In the process of step S2202, i.e., the copying process, a copy-forgery-inhibited-pattern image and document image need be associated with each other. A storage means stores a document image which is not associated with a copy-forgery-inhibited-pattern image. However, for example, in the process of step S2203, i.e., the copying process, copy-forgery-inhibited-pattern image data must be generated. More specifically, it is determined in step S804 whether document image data exists at a predetermined storage location. If it is determined that the document image data can be loaded (image data exists) (YES), the flow shifts to step S805.

In step S805, the document image data is read out from the storing apparatus, and at the same time copy-forgery-inhibited-pattern image data is generated. In step S806, the printing control unit 221 in the multi-function peripheral 1705 synthesizes the readout document image data and generated copy-forgery-inhibited-pattern image data, and sends the synthesized image data to the printer engine 125. The printer engine 125 forms the image data on output-paper.

As described above, according to the first embodiment, when copying of a paper document having an identification information is designated, an image corresponding to the paper document is read out from a storage device, copy-forgery-inhibited-pattern image data is synthesized with the image, and the synthesized data is output. Alternatively, a synthesized image which corresponds to the paper document and synthesized with a copy-forgery-inhibited-pattern image in advance is read out from the storage device and output. Hence, when the obtained output-product is copied by a general copying machine, a warning character string such as "COPY" is so reproduced as to be identifiable by the human eye. This can inhibited leakage of information from a high-quality copy created by reading out data from a storage device. Since no identification information is added to the output-product, read-out-printing from the storage device cannot be executed on the basis of the output-product. Thus, the warning character string is always reproduced when the obtained output-product is copied by any copying machine. This further enhances the effect of inhibiting leakage of information.

With the above effects, even if a high-quality copy created by reading out data from a storage device is distributed, the system can inhibited a person who receives the copy from leaking the information on the basis of the copy.

Second Embodiment

In the first embodiment, an identification information is added to a paper document created by the PDL process, and a copy-forgery-inhibited-pattern image is added to an output-product created by the copying process of the paper document.

To the contrary, in the second embodiment, an identification information and copy-forgery-inhibited-pattern image are added to a paper document created by the PDL process.

A process according to the second embodiment will be explained by giving attention to a difference (step S407) from the process according to the first embodiment.

In step S407 of the first embodiment, document image data, and identification information image data which is generated from an identification information are synthesized, and the synthesized image data is formed on output-paper to create a paper document.

To the contrary, in step S407 of the second embodiment, document image data, copy-forgery-inhibited-pattern image data, and identification information image data which is generated from an identification information are synthesized, and the synthesized image data is formed on output-paper to create a paper document.

Hence, a high-quality output-product created after the PDL process in the second embodiment is a printed product to which a copy-forgery-inhibited-pattern image and identification information image are added.

In addition to the effects of the first embodiment, the second embodiment can inhibited leakage of information from a high-quality output-product itself.

When the paper document undergoes a copying process, a copy containing only a copy-forgery-inhibited-pattern image is created, similar to the first embodiment.

Third Embodiment

In the system as a premise of the first embodiment, only an identification information is added to a paper document created by the PDL process. When the paper document undergoes a copying process, a copy is created by reading out an image from the storage means. The copy contains the identification information.

In the second embodiment, an identification information and copy-forgery-inhibited-pattern image are added to a paper document created by the PDL process. When the paper document undergoes a copying process, a copy is created by reading out an image from the storage means. The copy contains only the copy-forgery-inhibited-pattern image.

In contrast to this, in the third embodiment, an identification information is added to a paper document created by the PDL process, but as for a copy-forgery-inhibited-pattern image, the user can switch whether to add it. When the paper document containing a copy-forgery-inhibited-pattern image undergoes a copying process, a copy is created by reading out an image from the storage means. The copy contains only the copy-forgery-inhibited-pattern image. When the paper document containing no copy-forgery-inhibited-pattern image undergoes a copying process, a copy is created by reading out an image from the storage means. The copy contains only the identification information.

In the first and second embodiments, only identification information is associated with an image stored in the storage means in the PDL process. In the third embodiment, identification information is associated and synthesized with an image stored in the storage means in the PDL process. For this reason, a process which is not executed in the first and second embodiments is newly adopted. Details of the process will be described.

FIG. 17 is a block diagram showing a printing system having a function of reading out an image corresponding to a scanned document from a storage device and printing the image. As shown in FIG. 17, in the printing system, a host computer 1701, a printing apparatus (printer) 1702, and multi-function peripherals 1703 and 1705 are connected to each other via a network 1704 such as a LAN. Details of the units in the printing system shown in FIG. 17 are the same as those of the host computer 100, printing apparatus 110, and multi-function peripheral 120 in the printing system which have been described with reference to FIGS. 1 and 2.

As for a basic process sequence of reading out and printing (to be referred to as "read-out-printing" hereinafter) an image corresponding to a scanned document in the printing system according to the third embodiment, the host computer 1701 executes a driver process (step S2201), the printing apparatus 1702 executes a PDL process (step S2301), and then the multi-function peripheral 1705 executes a copying process (step S2203).

The flow of the driver process in step S2201 will be explained.

Figure 16:
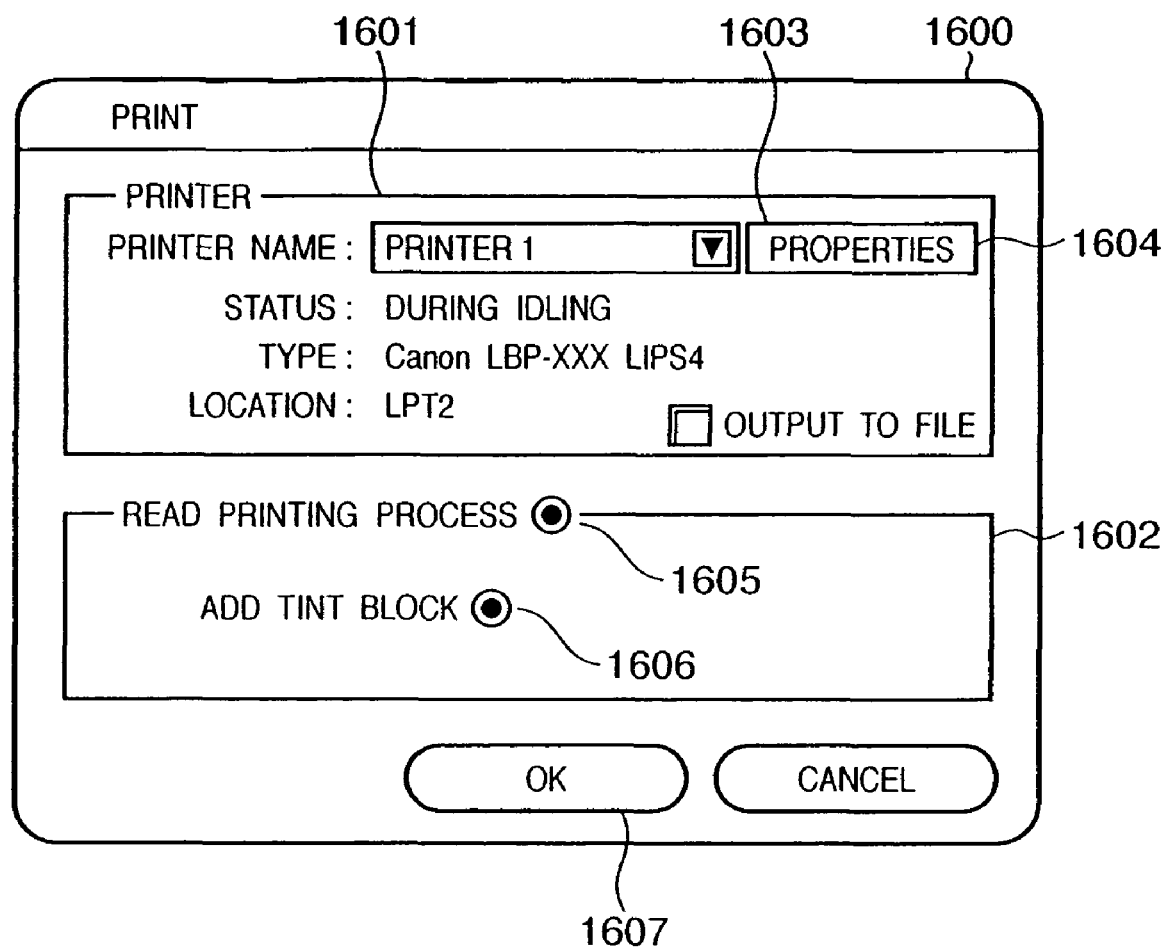
FIG. 16 is a schematic view showing an example of a driver window for setting whether to perform read-out-printing.

The user generates document image data by using the host computer 1701, and sets via a driver window shown in FIG. 16 whether to perform read-out-printing. The driver window shown in FIG. 16 will be explained. Reference numeral 1600 denotes an entire driver window; 1601, a setting area for a printer which prints; and 1602, a printing process setting area. The printer setting area 1601 has a scroll key 1603 for selecting a plurality of printers (e.g., printing apparatus 1702) connected to the network 1704, and a property button 1604 for performing detailed settings of the printer.

The read-out-printing process setting area 1602 has a read-out-printing setting button 1605 for making the read-out-printing function valid, and a copy-forgery-inhibited-pattern image setting button 1606 for adding a copy-forgery-inhibited-pattern image to document image data. When the read setting button 1605 is invalid, the copy-forgery-inhibited-pattern image setting button 1606 always becomes invalid. When the read setting button 1605 is valid, the copy-forgery-inhibited-pattern image setting button 1606 can be set valid or invalid. When the read setting button 1605 is valid, an identification information is added to document image data and output. When the copy-forgery-inhibited-pattern image setting button 1606 is valid, copy-forgery-inhibited-pattern image data is added to document image data and output.

When the read-out-printing function setting button 1605 is valid and the copy-forgery-inhibited-pattern image setting button 1606 is also valid, a paper document containing both a copy-forgery-inhibited-pattern image and identification information is output. When the paper document undergoes a copying process later, a copy is created by reading out an image from the storage means. The copy contains only the copy-forgery-inhibited-pattern image.

When the read setting button 1605 is valid and the copy-forgery-inhibited-pattern image setting button 1606 is invalid, a paper document containing only an identification information is output. When the paper document undergoes a copying process later, a copy is created by reading out an image from the storage means. The copy contains only the identification information.

Figure 23:
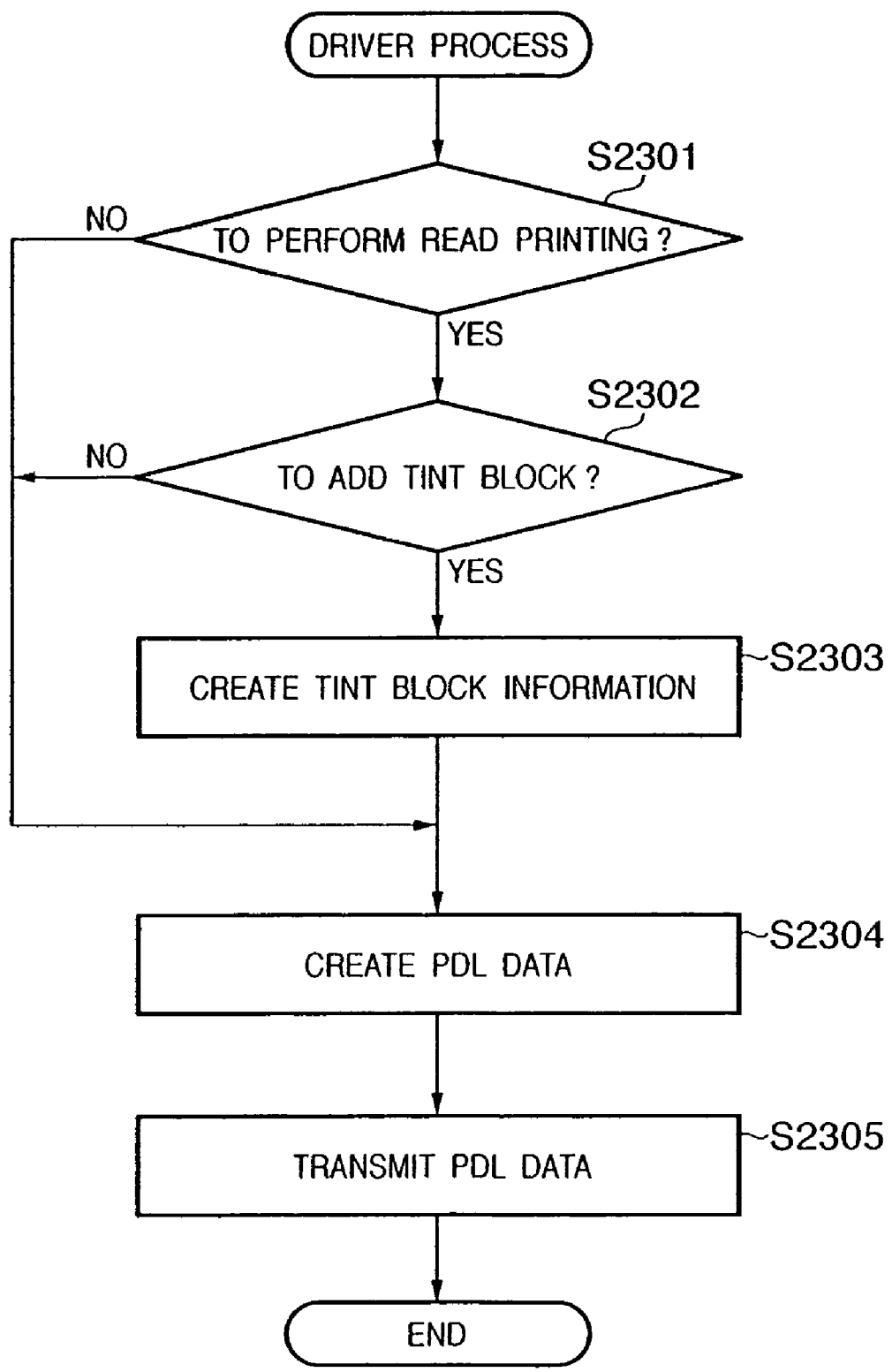
FIG. 23 is a flowchart for explaining a driver process.

FIG. 23 is a flowchart for explaining a sequence of creating PDL data in an external device according to the third embodiment. In the printing system shown in FIG. 17, it is determined whether it is set to perform the read-out-printing process (step S2301). If it is set to perform the read-out-printing process (YES), it is determined whether the copy-forgery-inhibited-pattern image function is set valid (step S2302). If the copy-forgery-inhibited-pattern image function is set valid (YES), the flow shifts to step S2303 to create copy-forgery-inhibited-pattern image information. If the copy-forgery-inhibited-pattern image function is set invalid (NO), the flow shifts to step S2304.

Figure 21:
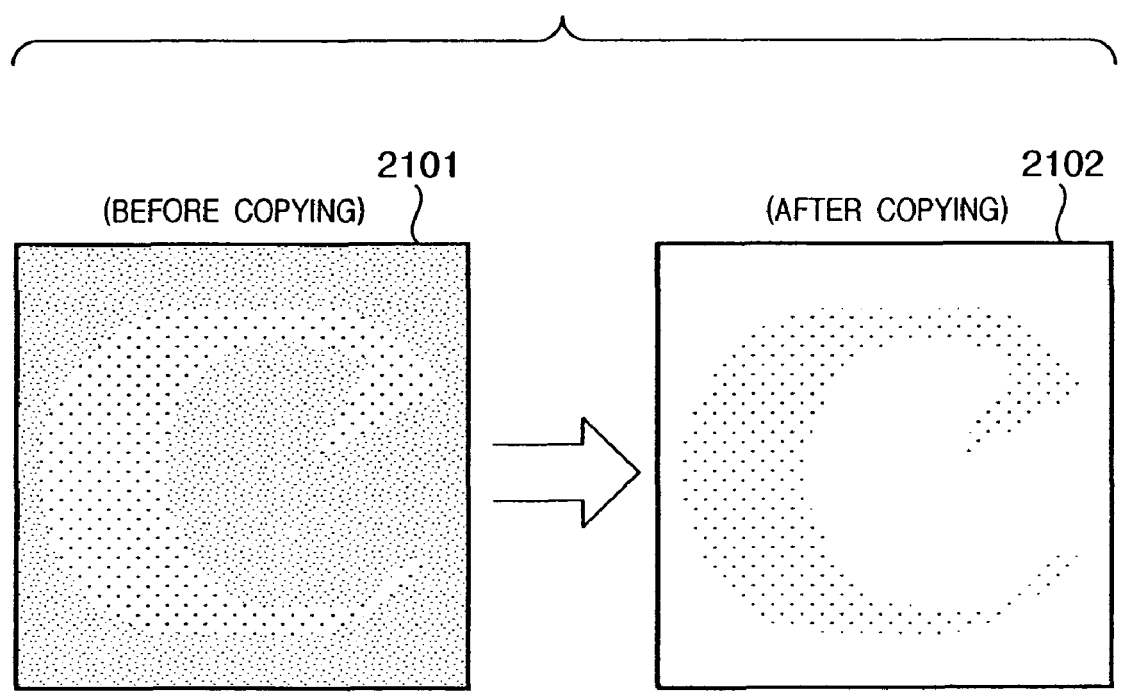
FIG. 21 is a view for explaining an example of an image before and after a copying process using a copy-forgery-inhibited-pattern image function.

The copy-forgery-inhibited-pattern image function will be explained. The copy-forgery-inhibited-pattern image function is implemented using the limit of dot reproducibility when a document is copied (read by a general scanner) by a copying machine or the like. The copy-forgery-inhibited-pattern image function is an image process function of forming a copy inhibited-pattern which is inconspicuous at a glance, and forming a (specific) image as a copy inhibited-pattern so as to clearly appear and be visually recognized on a copied image. In FIG. 21, an image 2101 is a copy-forgery-inhibited-pattern image before copying, and an image 2102 is an image obtained by copying the copy-forgery-inhibited-pattern image. In the example shown in FIG. 21, a pattern (small-dot-part) over the image 2101 disappears upon copying, and only a pattern "C" (large-dot-part) in the image remains in the copied image. This technique is often utilized as an anti-tampering function or the like. As the copy-forgery-inhibited-pattern image function setting method, various methods can be employed, and the method is not-particularly limited as far as a document is read by a scanner and it is explicitly represented that the document has been copied, thus inhibiting copying.

Figure 13:
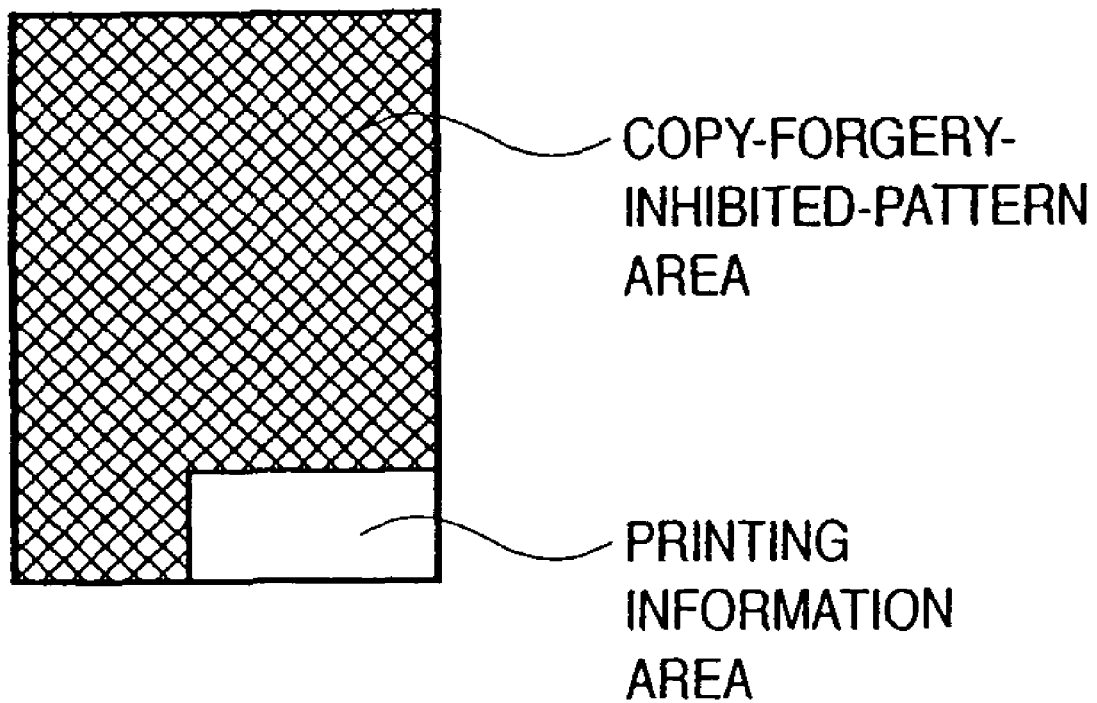
FIG. 13 is a view showing an example of a copy-forgery-inhibited-pattern image information area and read-out-printing information area in a copied document.
Figure 19:
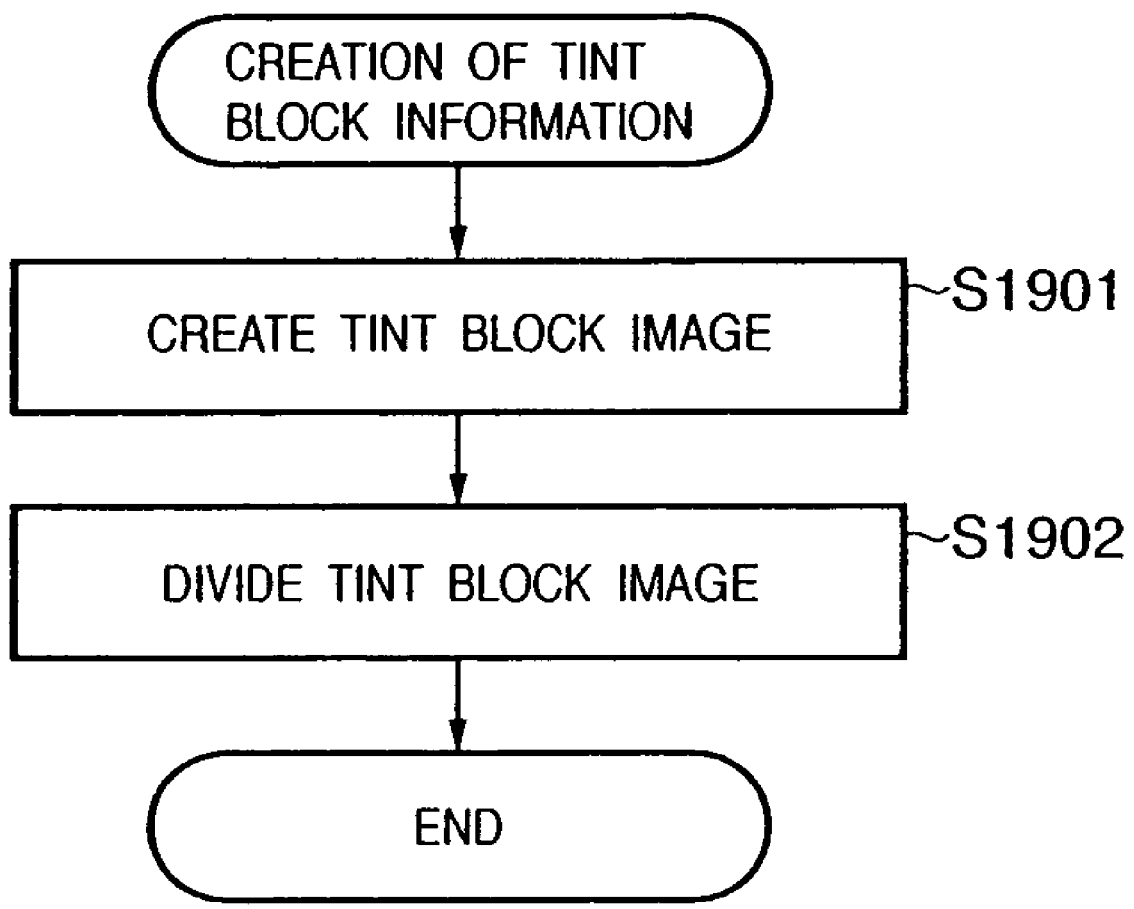
FIG. 19 is a flowchart for explaining details of a copy-forgery-inhibited-pattern image information creation process in step S2303.

FIG. 19 is a flowchart for explaining details of the copy-forgery-inhibited-pattern image information creation process in step S2303. More specifically, copy-forgery-inhibited-pattern image data is created (step S1901). The copy-forgery-inhibited-pattern image data created in step S1901 is divided into copy-forgery-inhibited-pattern image data 1 corresponding to a read-out-printing information area (area to which an identification information is to be added later), and copy-forgery-inhibited-pattern image data 2 corresponding to the remaining area, as shown in FIG. 13 (step S1902). After the above process ends, the flow shifts to step S2304. A copy-forgery-inhibited-pattern image corresponding to the area expresses a copy-forgery-inhibited-pattern image which is equal in length and width to the area. FIG. 13 is a view showing an example of the copy-forgery-inhibited-pattern image information area and read-out-printing information area.

After copy-forgery-inhibited-pattern image information is created in step S2303, PDL data is generated by a printer driver in use, and an application running on an external device such as the host computer 1701 (step S2304). The PDL data generated in step S2304 changes depending on whether the read-out-printing function and copy-forgery-inhibited-pattern image function are set valid in steps S2301 and S2302.

If read-out-printing is set valid in step S2301 and the copy-forgery-inhibited-pattern image function is set valid in step S2302 (to be referred to as "both of read-out-printing and the copy-forgery-inhibited-pattern image function have valid settings" hereinafter), the PDL data contains document image data, copy-forgery-inhibited-pattern image data 1, and copy-forgery-inhibited-pattern image data 2. Further, attribute information representing that the copy-forgery-inhibited-pattern image is added is generated, and associated with the PDL data.

If read-out-printing is set valid in step S2301 and the copy-forgery-inhibited-pattern image function is set invalid in step S2302 (to be referred to as "only the read-out-printing function has a valid setting" hereinafter), the PDL data contains only document image data. Attribute information representing that no copy-forgery-inhibited-pattern image is added is generated, and associated with the document image data.

If read-out-printing is set invalid in step S2301 and along with this, the copy-forgery-inhibited-pattern image function is set invalid (to be referred to as "both of read-out-printing and the copy-forgery-inhibited-pattern image function have invalid settings" hereinafter), the PDL data contains only document image data. No attribute information is associated with the document image data.

The PDL data generated in step S2304 is transmitted via the network 1704 to the printing apparatus 1702 from an external device such as the host computer 1701 (step S2305). After that, the flow returns to step S401 in the process of the flowchart in FIG. 4 described above, and the printing apparatus 1702 receives the PDL data transmitted in step S1804.

A PDL process (process from reception of PDL data by the printing apparatus 1702 up to output of a printed product) executed when the copy-forgery-inhibited-pattern image function is set invalid in step S2301 is almost the same as the process in the basic system described in the first embodiment. This PDL process is different from the process in the basic system in that an image stored in a storage destination is image data which is obtained by synthesizing identification information image data and document image data and contains an identification information, and that the stored image data with the identification information is associated with attribute information.

The process from reception of PDL data by the printing apparatus 1702 up to output of a printed product will be explained.

If both of read-out-printing and the copy-forgery-inhibited-pattern image function have valid settings, the printing apparatus 1702 converts PDL data created by an external device such as the host computer 1701 into intermediate language data, as described above with reference to the sequence in FIG. 4. Then, the printing apparatus 1702 performs a selection process for the storage destination of the image, details of which have been described with reference to the flowchart of FIG. 5. If it is determined that the printing apparatus 1702 (apparatus itself) does not have any storage location, the printing apparatus 1702 performs a storage search process, details of which have been described with reference to the flowchart of FIG. 6. The printing apparatus 1702 performs a storage process, details of which have been described with reference to the flowchart of FIG. 7. Then, the printing apparatus 1702 prints a copy-forgery-inhibited-pattern image. This process will be explained in detail below.

Before the storage process is performed, identification information image data must be generated. In addition, document image data, copy-forgery-inhibited-pattern image data 2, and identification information image data must be synthesized. As the synthesis method, for example, copy-forgery-inhibited-pattern image data 2 and identification information image data are synthesized with document image data. However, the synthesis method in the present invention is not limited to this, and the synthesis method as described in step S407 of the second embodiment may be adopted. Regardless of the synthesis method, an identification information must be so synthesized as to be recognizable in a subsequent copying process, as described in step S407 of the second embodiment. After the above process ends, the synthesized image data is stored and printed. In storing the image data, copy-forgery-inhibited-pattern image data 2 and the above-mentioned attribute information which is associated with PDL data must be associated with the synthesized image data. The format of an image stored in the storage process may be intermediate language data before synthesis and rendering, instead of synthesized image data after rendering. In this case, image data which is not synthesized with any of copy-forgery-inhibited-pattern image data 1, copy-forgery-inhibited-pattern image data 2, and identification information image data is stored. For this reason, when a read process is executed in a subsequent copying process, these image data must be synthesized and output. Identification information image data may be added by the host computer 1701.

In this manner, copy-forgery-inhibited-pattern image data 2 is added to an area of an image printed by the printing apparatus 1702 except an area where identification information image data is added. Since the printed image is directly received from the host computer 1701, the character string of the copy-forgery-inhibited-pattern image is inconspicuous at a glance (or cannot be visually recognized).

If only read-out-printing has a valid setting, the printing apparatus 1702 converts PDL data created by an external device such as the host computer 1701 into intermediate language data, as described above with reference to the sequence in FIG. 4. Then, the printing apparatus 1702 performs a selection process for the storage destination of the image, details of which have been described with reference to the flowchart of FIG. 5. If it is determined that the printing apparatus 1702 (apparatus itself) does not have any storage location, the printing apparatus 1702 performs a storage search process, details of which have been described with reference to the flowchart of FIG. 6. The printing apparatus 1702 performs a storage process, details of which have been described with reference to the flowchart of FIG. 7. Then, the printing apparatus 1702 prints. This process will be explained in detail below.

Before the storage process is performed, identification information image data must be generated. In addition, document image data and identification information image data must be synthesized. After this process ends, the synthesized image data is stored and printed. In storing the image data, attribute information which is associated with PDL data must be associated. The format of an image stored in the storage process may be intermediate language data before synthesis and rendering, instead of synthesized image data after rendering. In this case, image data which is not synthesized with either identification information image data or document image data is stored. Thus, when a read process is executed in a subsequent copying process, these image data must be synthesized and output. Identification information image data may be added by the host computer 1701. An image printed by the printing apparatus 1702 contains the identification information image data, but no copy-forgery-inhibited-pattern image data.

If both of read-out-printing and the copy-forgery-inhibited-pattern image function have invalid settings, the printing apparatus 1702 performs a general printing process on the basis of PDL data created by an external device such as the host computer 1701. By the above process, the PDL process in step S2202 of FIG. 3 ends.

Figure 20:
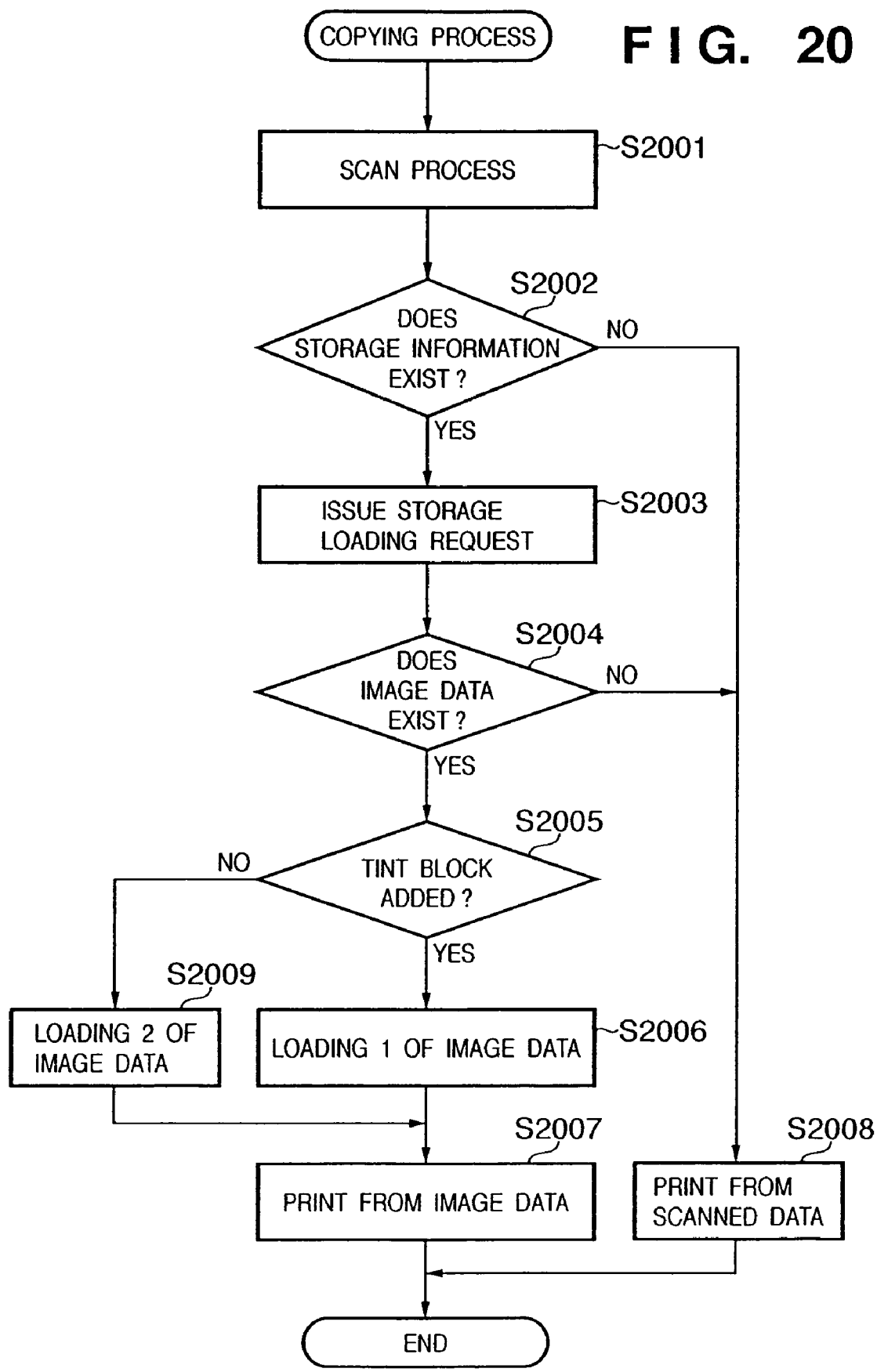
FIG. 20 is a flowchart for explaining details of a copying process by a multi-function peripheral 1703(1705) in step S2203.

The flow advances to step S2203 to perform a copying process. FIG. 20 is a flowchart for explaining details of the copying process by the multi-function peripheral 1703(1705) in step S2203.

A document is scanned using the scanner 127 shown in FIG. 2, and the scan result is stored in the temporary area of a RAM 123 or HDD 124 serving as a storage device shown in FIG. 1 (step S2001).

It is determined whether the paper document scanned in step S2001 contains storage information (step S2002). In determination, it is determined whether an identification information is added into image data obtained by scanning the paper document. If an identification information is added, i.e., storage information exists (YES), the flow advances to step S2003; if no identification information is added, i.e., no storage information exists (NO), to step S2008.

If storage information exists in step S2002 (YES), a storage loading request is issued (step S2003). Information used for the loading request is acquired on the basis of information contained in the identification information, and uses packet data shown in FIG. 11.

It is determined on the basis of the result of the storage loading request in step S2003 whether image data has been stored (step S2004). If it is determined that the image data can be loaded (i.e., image data is stored) (YES), the flow shifts to step S2005; if it is determined that no image data can be loaded (i.e., no image data is stored) (NO), to step S2008.

It is determined whether attribute information associated with image data corresponding to the identification information, i.e., image data stored in the storage means represents addition of a copy-forgery-inhibited-pattern image or no addition of any copy-forgery-inhibited-pattern image (step S2005). If it is determined that the attribute information represents addition of a copy-forgery-inhibited-pattern image (YES), the flow shifts to step S2006; if it is determined that the attribute information represents no addition of any copy-forgery-inhibited-pattern image (NO), to step S2009.

Figure 14:
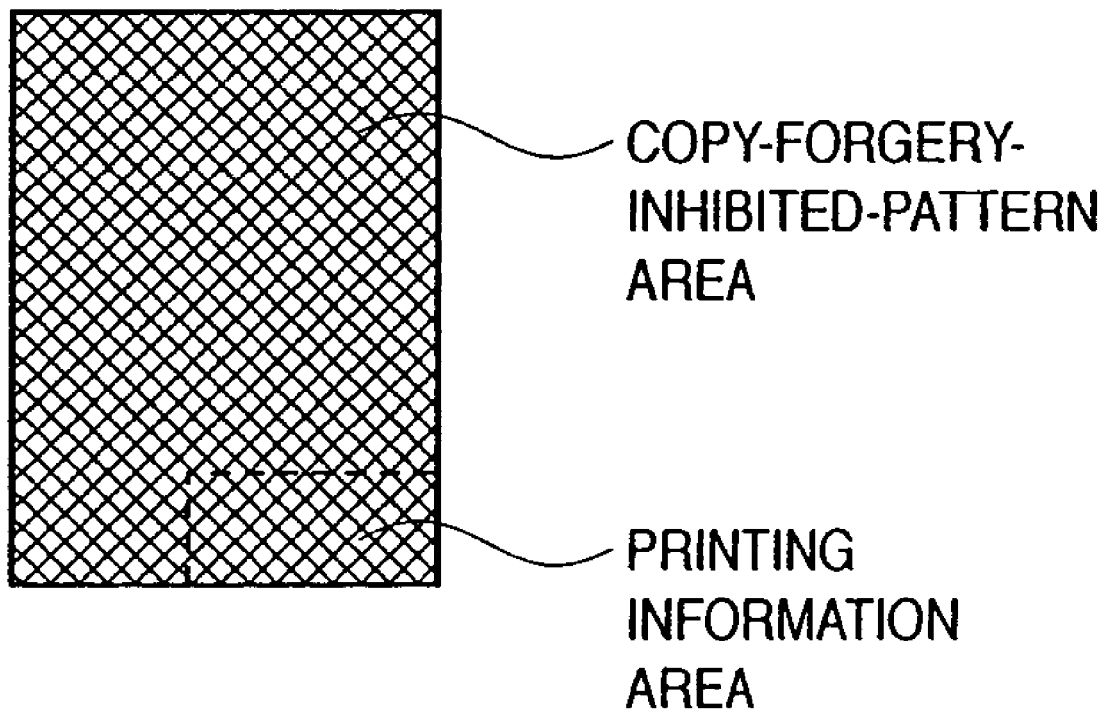
FIG. 14 is a view showing the copy-forgery-inhibited-pattern image information area in the copied document.

Details of the process in step S2006 will be explained. More specifically, image data is loaded from a device indicated by the storing device address 1201 in FIG. 12 (step S1501). The image data is stored in the temporary area of the HDD 124 of the device via a communication interface 126 in FIG. 1 (step S1502). Before the image is stored in the HDD 124, identification information image data of the image data is overwritten with copy-forgery-inhibited-pattern image data 1, as shown in FIG. 14. This can prevent-printing of an output-product after the copying process by using the function of reading out a document from a storage device by using an identification information. Thereafter, a printer engine 125 converts the image data stored in the HDD 124 into a video signal, and outputs the image onto paper (step S2007). FIG. 14 is a view conceptually showing a state in which the read-out-printing information area on a document obtained by the copying process is covered with a copy-forgery-inhibited-pattern image.

Details of the process in step S2009 will be explained. More specifically, image data is loaded from a device indicated by the storing device address 1201 in FIG. 12 (step S1501). The image data is stored in the temporary area of the HDD 124 of the device via the communication interface 126 in FIG. 1 (step S1502). Unlike step S2006, no copy-forgery-inhibited-pattern image data is synthesized. Hence, a document can be read out from the storage device by using an identification information, and printed on the basis of the output-product after the copying process. Subsequently, the printer engine 125 converts the image data stored in the HDD 124 into a video signal, and outputs the image onto paper (step S2007).

In step S2008, similar to a general copying process, image data scanned in step S801 is developed in the HDD 124 of FIG. 1, and the printer engine 125 converts the image data stored in the HDD 124 into a video signal and outputs the image onto paper.

In the above description, image data obtained by synthesizing identification information image data, copy-forgery-inhibited-pattern image data, and document image data 2 is stored in step S2202 when both of read-out-printing function and the copy-forgery-inhibited-pattern image function have valid settings. However, the present invention is not limited to this. For example, an image to be stored may be only document image data or copy-forgery-inhibited-pattern image data (before division), and an identification information (not identification information image data) may be associated with the document image data, as described in the first and second embodiments. With this process, no copy-forgery-inhibited-pattern image data need be divided in step S1902. In step S1502, not copy-forgery-inhibited-pattern image data 1 but copy-forgery-inhibited-pattern image data 1 before division is synthesized with the document image data.

According to the third embodiment, when both of read-out-printing and the copy-forgery-inhibited-pattern image function have valid settings, copy-forgery-inhibited-pattern image data 1 is synthesized with identification information image data to make identification information disappear in loading image data which is stored while being synthesized with identification information image data and copy-forgery-inhibited-pattern image data 2.

According to the third embodiment, the user can switch the setting of whether or not to add a copy-forgery-inhibited-pattern image while adding an identification information to a paper document created by a PDL process. The third embodiment can, therefore, provide a system capable of creating an output-product which can inhibited leakage of information, as described in the second embodiment, and repetitively creating an output-product which cannot inhibited leakage of information but is identical to an original document.

Other Embodiment

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit-performs all or a part of the actual processing so that the functions of the foregoing embodiments can be implemented by this processing.

The present invention can inhibited leakage of information from a high-quality copy created by reading out data from a storage device.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-245686 filed on Aug. 25, 2004 and 2005-239762 filed on Aug. 22, 2005, which are hereby incorporated by reference herein.

What is claimed is:

1. A method of controlling an image processing apparatus, comprising:
    a barcode acquisition step of acquiring a barcode contained in a scanned image;
    an obtaining step of obtaining, from among images stored in a storage device, a stored image which contains the barcode, using the barcode acquired in said barcode acquisition step;
    a first determination step of determining whether or not information stored in the storage device in association with the stored image obtained in said obtaining step indicates that the stored image is to be synthesized with a second image;
    a synthesized-image generation step of generating a synthesized-image in a temporary storage location, when it is determined in said first determination step that the information indicates the stored image is to be synthesized with the second image, by overwriting barcode image data of the stored image with image data of the second image, to thereby generate a synthesized-image having no barcode image data in the temporary storage location, while retaining the stored image which contains the barcode in the storage device; and
    an output step of outputting the synthesized-image generated in said synthesized-image generation step or, when said first determination step determines that the information indicates the stored image is not to be synthesized with the second image, outputting the stored image,
    wherein the stored image includes a first image in an area other than the area of the barcode, the first image and the second image are images consisting of big dots and small dots, and
    wherein at least said first determination step and said synthesized-image generation step are performed by a processor.

2. The method according to claim 1, further comprising a second determination step of determining whether or not the barcode is acquirable from the scanned image, wherein when the barcode is determined in the second determination step to be unacquirable, the output step outputs the scanned image.

3. An image processing apparatus comprising:

a barcode acquisition unit configured to acquire a barcode contained in a scanned input image;

an obtaining unit configured to obtain, from among images stored in a storage device, a stored image which contains the barcode, using the barcode acquired by said barcode acquisition unit;

a first determination unit configured to determine whether or not information stored in the storage device in association with the stored image obtained by said obtaining unit indicates the stored image is to be synthesized with a second image;

a synthesized image generation unit configured to generate a synthesized image in a temporary storage location, when it is determined by said first determination unit that the information indicates the stored image is to be synthesized with the second image, by overwriting barcode image data of the stored image with image data of the second image, to thereby generate a synthesized-image having no barcode image data in the temporary storage location, while retaining the stored image which contains the barcode in the storage device; and an output unit configured to output the synthesized image synthesized by said synthesized-image generation unit or, when said first determination unit determines that the information indicates the stored image is not to be synthesized with the second image, to output the stored image;

wherein the stored image includes a first image in an area other than the area of the barcode, the first image and the second image are images consisting of big dots and small dots.

4. The apparatus according to claim 3, further comprising a second determination unit configured to determine whether the barcode is acquirable from the scanned image data, wherein when the barcode is determined in the second determination unit to be unacquirable, the output unit outputs the scanned image data.

* * * * *